(12) United States Patent
Nowak

(10) Patent No.: US 11,973,813 B2
(45) Date of Patent: *Apr. 30, 2024

(54) SYSTEMS AND METHODS FOR MULTIPLE DEVICE CONTROL AND CONTENT CURATION

(71) Applicant: Benjamin Nowak, Atlanta, GA (US)

(72) Inventor: Benjamin Nowak, Atlanta, GA (US)

(*) Notice: Subject to any disclaimer, the term of this patent is extended or adjusted under 35 U.S.C. 154(b) by 137 days.

This patent is subject to a terminal disclaimer.

(21) Appl. No.: 17/509,459

(22) Filed: Oct. 25, 2021

(65) Prior Publication Data

US 2022/0053040 A1 Feb. 17, 2022

Related U.S. Application Data

(63) Continuation of application No. 17/013,729, filed on Sep. 7, 2020, now Pat. No. 11,165,840, which is a
(Continued)

(51) Int. Cl.
*H04L 65/61* (2022.01)
*H04L 65/60* (2022.01)
(Continued)

(52) U.S. Cl.
CPC .............. *H04L 65/61* (2022.05); *H04L 65/60* (2013.01); *H04N 5/77* (2013.01); *H04N 23/661* (2023.01); *H04N 23/90* (2023.01); *H04W 4/80* (2018.02)

(58) Field of Classification Search
CPC .............. H04N 5/265; H04N 5/23206; H04N 5/23238; H04N 5/247; H04N 5/77;
(Continued)

(56) References Cited

U.S. PATENT DOCUMENTS 3,717,422 A 2/1973 Knoos et al.
6,208,376 B1 3/2001 Tanaka et al.
(Continued)

FOREIGN PATENT DOCUMENTS

CA 2298958 A1 1/2001
EP 1998567 A1 12/2008
(Continued)

OTHER PUBLICATIONS

International Search Report and Written Opinion dated Feb. 1, 2016 cited in Application No. PCT/US2015/055580, 8 pgs.
(Continued)

*Primary Examiner* — Dakshesh D Parikh
(74) *Attorney, Agent, or Firm* — BEKIARES ELIEZER LLP

(57) ABSTRACT

Disclosed is a master electronic device configured to create a content capture session executable by a plurality of electronic devices comprising at least one client electronic device. The master electronic device may comprise: a user interface module configured to receive at least one session parameter; a processor configured to create at least one content capture session based on the at least one session parameter; and a communication means configured to communicate data between the master electronic device and at least one client electronic device, wherein the communication comprises transmission of at least one session parameter, wherein the at least one client electronic device is configured to participate in the at least one content capture session according to the at least one session parameter.

20 Claims, 15 Drawing Sheets

Related U.S. Application Data continuation of application No. 16/517,104, filed on Jul. 19, 2019, now Pat. No. 10,771,518, which is a continuation of application No. 15/049,669, filed on Feb. 22, 2016, now Pat. No. 10,362,075, which is a continuation-in-part of application No. 14/883,303, filed on Oct. 14, 2015, now Pat. No. 9,704,531, and a continuation-in-part of application No. 14/883,262, filed on Oct. 14, 2015, now Pat. No. 11,158,345.

(60) Provisional application No. 62/064,464, filed on Oct. 15, 2014.

(51) Int. Cl.
*H04N 5/77* (2006.01)
*H04N 23/661* (2023.01)
*H04N 23/90* (2023.01)
*H04W 4/80* (2018.01)

(58) Field of Classification Search
CPC .......... H04N 5/05; H04N 5/87; H04N 9/8205; H04N 9/87; G11B 27/031; G11B 27/10; G11B 31/006; G11B 33/10; H04L 65/4069; H04L 65/60; H04L 67/142; H04W 4/008
See application file for complete search history.

(56) References Cited

U.S. PATENT DOCUMENTS

| | | |
|---|---|---|
| 6,342,900 B1 | 1/2002 | Ejima et al. |
| 8,660,965 B1 | 2/2014 | Bickerstaff |
| 8,813,154 B1 | 8/2014 | Sivertsen |
| 9,704,531 B2 | 7/2017 | Nowak |
| 10,362,075 B2 | 7/2019 | Nowak |
| 10,771,518 B2 | 9/2020 | Nowak |
| 11,158,345 B2 | 10/2021 | Nowak |
| 11,165,840 B2 | 11/2021 | Nowak |
| 2003/0113096 A1 | 6/2003 | Taira et al. |
| 2004/0096185 A1 | 5/2004 | Takeuchi et al. |
| 2005/0149481 A1 | 7/2005 | Hesslink et al. |
| 2006/0010199 A1 | 1/2006 | Brailean et al. |
| 2006/0022954 A1 | 2/2006 | Berry |
| 2006/0033954 A1 | 2/2006 | Kamijima et al. |
| 2007/0117083 A1 | 5/2007 | Winneg et al. |
| 2007/0187183 A1 | 8/2007 | Saigh et al. |
| 2007/0268121 A1 | 11/2007 | Vasefi et al. |
| 2008/0052371 A1 | 2/2008 | Partovi et al. |
| 2008/0143875 A1 | 6/2008 | Scott et al. |
| 2008/0210880 A1 | 9/2008 | Baroni et al. |
| 2009/0089322 A1 | 4/2009 | Naaman |
| 2009/0096871 A1 | 4/2009 | Kuwano et al. |
| 2010/0272102 A1 | 10/2010 | Kobayashi |
| 2011/0030016 A1 | 2/2011 | Pino, Jr. et al. |
| 2012/0319997 A1 | 12/2012 | Majumder |
| 2013/0003757 A1 | 1/2013 | Boatright et al. |
| 2013/0024299 A1 | 1/2013 | Wong et al. |
| 2013/0093904 A1 | 4/2013 | Wagner et al. |
| 2013/0209059 A1 | 8/2013 | Scheele et al. |
| 2013/0216155 A1 | 8/2013 | Lim et al. |
| 2013/0225067 A1 | 8/2013 | Card et al. |
| 2013/0259446 A1 | 10/2013 | Sathish |
| 2013/0272186 A1 | 10/2013 | Mohanty et al. |
| 2013/0300933 A1 | 11/2013 | Thorson |
| 2014/0180615 A1 | 6/2014 | Simon |
| 2014/0186004 A1 | 7/2014 | Hamer |
| 2014/0223463 A1 | 8/2014 | Hatambeiki et al. |
| 2014/0240469 A1 | 8/2014 | Lee |
| 2014/0253722 A1 | 9/2014 | Smyth |
| 2014/0297717 A1 | 10/2014 | Grossman et al. |
| 2014/0307167 A1 | 10/2014 | Zehler et al. |
| 2014/0328578 A1 | 11/2014 | Shafron et al. |
| 2014/0355947 A1 | 12/2014 | Slamecka et al. |
| 2014/0355951 A1* | 12/2014 | Tabak ................ G11B 27/3036 386/241 |
| 2015/0049192 A1 | 2/2015 | Hooton |
| 2015/0143239 A1 | 5/2015 | Birkbeck et al. |
| 2015/0348044 A1 | 12/2015 | Smith |
| 2015/0352446 A1 | 12/2015 | Ma et al. |
| 2015/0365627 A1 | 12/2015 | Deng et al. |
| 2016/0019526 A1 | 1/2016 | Grandbery et al. |
| 2016/0026161 A1 | 1/2016 | Marutani et al. |
| 2016/0077422 A1 | 3/2016 | Wang et al. |
| 2016/0094773 A1 | 3/2016 | Maciuca et al. |
| 2016/0097861 A1 | 4/2016 | Li et al. |
| 2016/0111128 A1 | 4/2016 | Nowak |
| 2016/0112649 A1 | 4/2016 | Nowak |
| 2016/0171596 A1 | 6/2016 | Angerbauer et al. |
| 2016/0180884 A1 | 6/2016 | Nowak |
| 2016/0182849 A1 | 6/2016 | Wakao |
| 2016/0244311 A1 | 8/2016 | Burks et al. |
| 2016/0283922 A1 | 9/2016 | Jinno et al. |
| 2016/0311442 A1 | 10/2016 | Shin et al. |
| 2017/0111413 A1 | 4/2017 | Nowak |
| 2019/0037251 A1 | 1/2019 | Tsukagoshi |
| 2019/0342353 A1 | 11/2019 | Nowak |
| 2021/0067572 A1 | 3/2021 | Nowak |
| 2022/0044705 A1 | 2/2022 | Nowak |

FOREIGN PATENT DOCUMENTS

| | | |
|---|---|---|
| JP | 9289636 A | 11/1997 |
| JP | 11341443 A | 12/1999 |
| JP | 2004140797 A | 5/2004 |
| JP | 2006108790 A | 4/2006 |
| JP | 2006140559 A | 6/2006 |
| JP | 2007282279 A | 10/2007 |
| JP | 2008278237 A | 11/2008 |
| JP | 2011049857 A | 3/2011 |
| JP | 2014011633 A | 1/2014 |
| WO | 2011060809 A1 | 5/2011 |
| WO | 2014093668 A1 | 6/2014 |
| WO | 2016061261 A1 | 4/2016 |

OTHER PUBLICATIONS

U.S. Non-Final Office Action dated Dec. 14, 2016 cited in U.S. Appl. No. 14/883,303, 7 pgs.

International Preliminary Report on Patentability and Written Opinion dated Apr. 18, 2017 Application No. PCT/US2015/055580, 6 pgs.

U.S. Non-Final Office Action dated Oct. 18, 2017 cited in U.S. Appl. No. 14/883,262, 22 pgs.

U.S. Final Office Action dated May 23, 2018 cited in U.S. Appl. No. 14/883,262, 25 pgs.

European Search Report dated May 30, 2018 cited in Application No. 15849969.9, 8 pgs.

U.S. Non-Final Office Action dated Jul. 18, 2018 cited in U.S. Appl. No. 15/049,669, 12 pgs.

Chinese First Office Action dated Feb. 1, 2019 cited in Application No. 201580063297.9, 11 pgs.

Japanese Notice of Reasons for Refusal dated Mar. 26, 2019 cited in Application No. 2017-521154, 5 pgs.

Chinese Second Office Action dated Sep. 11, 2019 cited in Application No. 201580063297.9, 11 pgs.

Israeli First Office Action dated Oct. 28, 2019 cited in Application No. 251691, 14 pgs.

U.S. Non-Final Office Action dated Nov. 4, 2019 cited in U.S. Appl. No. 14/883,262, 31 pgs.

European Communication dated Feb. 14, 2020 cited in Application No. 15849969.9, 10 pgs.

Japanese Decision of Refusal dated Mar. 3, 2020 cited in Application No. 2017-521154, 15 pgs.

U.S. Final Office Action dated dated Jun. 2, 2020 cited in U.S. Appl. No. 14/883,262, 26 pgs.

U.S. Non-Final Office Action dated dated Dec. 28, 2020 cited in U.S. Appl. No. 14/883,262, 19 pgs.

(56) References Cited

OTHER PUBLICATIONS

European Second Examination Report dated May 11, 2021 cited in Application No. 15849969.9, 12 pgs.
Related U.S. Appl. No. 17/509,382, filed Oct. 25, 2021 entitled "Controlling Capture of Content Using One or More Client Electronic Devices" (copy available in IFW).
Canadian Examiner's Report dated Oct. 14, 2021 cited in Application No. 2,964,509, 3 pgs.
U.S. Non-Final Office Action dated Mar. 31, 2023 cited in U.S. Appl. No. 17/509,382, 45 pgs.
U.S. Final Office Action dated Jul. 24, 2023 cited in U.S. Appl. No. 17/509,382, 20 pgs.

* cited by examiner

SYSTEMS AND METHODS FOR MULTIPLE DEVICE CONTROL AND CONTENT CURATION

RELATED APPLICATIONS

The present application is a continuation of U.S. application Ser. No. 17/013,729 filed on Sep. 7, 2020, which issues on Nov. 2, 2021 as U.S. Pat. No. 11,165,840, which is a continuation of U.S. application Ser. No. 16/517,104 filed on Jul. 19, 2019, which issued on Sep. 8, 2020 as U.S. Pat. No. 10,771,518, which is a continuation of U.S. application Ser. No. 15/049,669 filed on Feb. 22, 2016, which issued on Jul. 23, 2019 as U.S. Pat. No. 10,362,075, which is a Continuation-In-Part to:

Related U.S. application Ser. No. 14/883,262 filed on Oct. 14, 2015, which issues on Oct. 26, 2021 as U.S. Pat. No. 11,158,345, which claims priority to U.S. Provisional Application No. 62/064,464 filed on Oct. 15, 2014, which is incorporated herein by reference in its entirety; and Related U.S. application Ser. No. 14/883,303 filed on Oct. 14, 2015, which issued on Jul. 11, 2017 as U.S. Pat. No. 9,704,531, which claims priority to U.S. Provisional Application No. 62/064,464 filed on Oct. 15, 2014, which is incorporated herein by referenced in its entirety.

It is intended that each of the referenced applications may be applicable to the concepts and embodiments disclosed herein, even if such concepts and embodiments are disclosed in the referenced applications with different limitations and configurations and described using different examples and terminology.

FIELD OF THE INVENTION

Generally, the disclosure relates to electronic devices. More specifically, the disclosure relates to methods, systems and devices for creating a content capture session executable by a plurality of electronic devices.

BACKGROUND

There are several situations where content needs to be captured using two or more content capturing devices. For example, in film production, it is common to use a multiple camera setup for capturing visual content of a scene. The multiple camera setup includes two or more cameras positioned at different spatial coordinates. Accordingly, the scene may be recorded from two or more different viewpoints. Such multi-camera systems often require a substantial level of technical expertise, director supervision, and a significant amount of post-production editing.

For example, in order to produce a final composition of content captured using the two or more content capturing devices, complex post-production editing is generally required. Videos obtained from the two or more cameras in the multiple camera setup may be subjected to synchronization and stitching under supervision of a human editor. As a result, a final video including visual content captured from different viewpoints may be obtained. This process of stitching is complex, time consuming and burdensome. Moreover, processing content captured using two or more content capturing devices involves the use of complex processing tools. For example, postproduction editing of the videos obtained from the multiple camera setup require complex and expensive video processing software.

Accordingly, there is a need for improved methods, systems and devices for capturing content using two or more content capturing devices.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Disclosed is a master electronic device configured to create a content capture session executable by a plurality of electronic devices. The plurality of electronic devices may include one or more client electronic devices. Further, the master electronic device may include a user interface module configured to receive one or more session parameters. Additionally, the master electronic device may include a processor configured to create one or more content capture sessions based on the one or more session parameters. Further, the master electronic device may include a communication means configured to communicate data between the master electronic device and one or more client electronic devices. The communication may include transmission of the one or more session parameters. Accordingly, the one or more client electronic devices may be configured to participate in the one or more content capture sessions based on the one or more session parameters.

Also disclosed is a client electronic device configured to participate in one or more content capture sessions executable by a plurality of electronic devices. The plurality of electronic devices may include each of a master electronic device and the client electronic device. Further, the client electronic device may include a communication means configured to communicate data between the master electronic device and the client electronic device. The communication may include receiving one or more session parameters. Additionally, the client electronic device may include a content capturing means configured to perform one or more content capture sessions according to the one or more session parameters.

Further disclosed is a method of presenting a plurality of content captured by a plurality of electronic devices. The method may include presenting, at a client electronic device, a user interface configured to receive one or more of a plurality of device indicators corresponding to the plurality of electronic devices and a content indicator corresponding to the plurality of content captured by the plurality of electronic devices. Further, the method may include receiving, at a server, one or more of the plurality of device indicators and the content indicator. Additionally, the method may include identifying the plurality of content based on one or more of the plurality of device indicators and the content indicator. Furthermore, the method may include transmitting the plurality of content to the client electronic device. Accordingly, the client electronic device may be configured for presenting the plurality of content.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
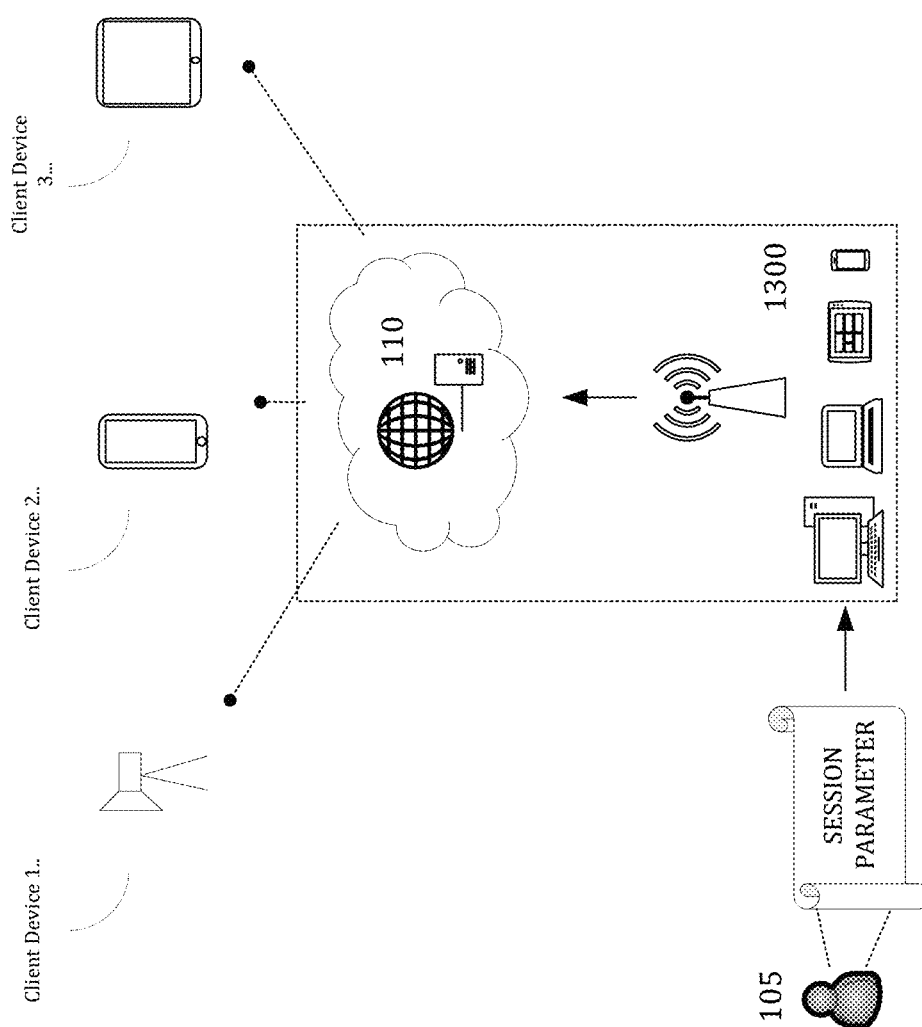
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. .sctn.112, 6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of film production, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope. The methods, systems and devices for managing a content capture session executable by a plurality of electronic devices may be used by individuals or companies to manage content capture sessions executable by each of a master electronic device and one or more client electronic devices.

The present disclosure relates to techniques for managing content capture sessions. Managing the content capture session may include one or more of defining the content capture session, creating the content capture session, modifying the content capturing session, monitoring the content capture session and terminating the content capture session. The disclosed techniques may be used for collaboratively capturing content using a plurality of electronic devices. Further, the plurality of electronic devices may be configured for capturing content in one or more forms such as, for example, audio, images, video and multimedia.

One of the plurality of electronic devices may function as a master electronic device while one or more other electronic devices may function as one or more client electronic devices. Further, a content capture session may include participation of the one or more client electronic devices under the direction of the master electronic device. In other words, the master electronic device may be configured to manage the content capture session. Accordingly, the one or more client electronic devices may be configured to communicate with the master electronic device. Further, the one or more client electronic devices may be configured to participate in the content capture session under the control of the master electronic device.

The master electronic device may be operated by a user called as a "director". Further, a client electronic device of the one or more client electronic devices may be operated by a user called as a "camera person". Accordingly, the director may be enabled to provide control inputs in order to manage the one or more content capture sessions. As a result, greater control is provided to the director in managing the content capture session.

Further, the control inputs may include one or more session parameters corresponding to a content capture session. The one or more session parameters in general may represent information that characterizes one or more aspects of the content capture session. For instance, the one or more session parameters may determine which electronic devices of the plurality of electronic devices may participate in the content capture session. Similarly, the one or more session parameters may determine how the plurality of electronic devices may participate in the content capture session. Likewise, the one or more session parameters may determine conditions under which the plurality of electronic devices may participate in the one or more content capture sessions. Further, the one or more session parameters may determine how content captured by the plurality of electronic devices may be processed.

Further, in some embodiments, the one or more session parameters may represent information regarding one or more operations to be performed in relation to capturing content. The one or more operations may be performable at various time instants in relation capturing content. For instance, in some embodiments, the one or more operations may be performable prior to initiating capture of content. In some embodiments, the one or more operations may be performable during capture of content. In some other embodiments, the one or more operations may be performable subsequent to termination of capture of content.

Accordingly, techniques of the present disclosure may be used for collaboratively capturing content such as, for example, video, using multiple content capturing devices such as, for example, smart phones. For instance, a scene including one or more physical objects may be synchronously captured using two or more video cameras. Accordingly, depending on spatial positions of the two or more video cameras, different views of the scene may be captured synchronously.

Initially, an app executable on the master electronic device may present a graphical user interface (GUI) to the director in order to activate recording using multiple devices. Once activated, the director may be presented with an option to select one or more other users to act as camera persons. For example, the director may be enabled to select one or more friends who are in the vicinity of the director. This may be accomplished, for example, by discovering presence of client cameras over a Bluetooth network.

Further, the director may be enabled to send an invitation to the selected users to act as camera persons. The invitation may be sent over a communication network such as Bluetooth, Wi-Fi, etc. In some instances, the invitation may include a personal note from the director describing the purpose of the invitation, time of recording, place of recording, subject of recording and any other specific instructions to be followed by the camera persons while recording video such as a camera angle to be adopted.

Upon receiving the invitation, a user may either accept or reject the invitation. Subsequently, acceptance or rejection of the invitation corresponding to the one or more selected users may be displayed to the director. This allows the director to know who among the one or more selected users would be collaborating in recording the video.

Subsequently, the client cameras may be temporally synchronized with the master camera. For instance, a current time on the master camera may be transmitted to all the client cameras. Accordingly, the client cameras may change their current times to the current time on the master camera. Thus, both the master camera and each client camera may be synchronized in time. Additionally, the director may be able to indicate one or more session parameters corresponding to the collaborative content capture specific to the device operated by each of the camera persons. The one or more session parameters may include information such as camera settings to be used during the collaborative content capture, post processing to be performed on the captured videos and storage/transmission related operations related to the captured videos.

Thereafter, the director may be enabled to issue commands to the client cameras in order to coordinate recording of the collaborative video. For instance, the director may be enabled to initiate recording at a time $T.sub.i$ by activating a record button on the GUI. Consequently, each client camera may begin recording of video at $T.sub.i$ according to the one or more session parameters. At any point in time, the director may be enabled to issue further commands such as for example, a command to pause the recording of video. Accordingly, each client camera may receive the command and pause recording. Similarly, the director may be enabled to issue a command to terminate recording of video at the client cameras.

Subsequently, the client cameras may send the respective video recordings to the master camera over a communication network such as Bluetooth or Wi-Fi. Alternatively, the video recordings from the client cameras may be transferred to the cloud from where the director may access the video recordings. Thereafter, the director may be presented with a synchronized display of all the video recordings in a split screen. Thus, the director may be able to view an event from multiple different views as synchronously captured by respective client cameras.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. The operating environment may comprise methods, systems, and devices collectively referred to as a platform. The platform may include a master electronic device and a client electronic device. The platform may further include computing devices in operative communication with the master electronic device and the client electronic device. Moreover, the platform may include a networking environment for facilitating communication between the master electronic device, client electronic device, and various computing devices. Although the present disclosure refers to various functions and operations performed by particular components of the platform (e.g., a master electronic device or client electronic devices), it should be understood that some platform components may be interchanged with others, and/or, where necessary, combined with other components to perform the functions and operations intended.

By way of non-limiting example, a collaborative content capturing platform 100 may be interconnected using a network 110. In some embodiments, network 110 may comprise a Local Area Network (LAN), a Bluetooth network, a Wi-Fi network and a cellular communication network. In other embodiments the collaborative content capturing platform may be hosted on a centralized server, such as, for example, a cloud computing service. A user 105 (e.g., director) may access platform 100 through a software application. The software application may be embodied as, for example, but not be limited to, a website, a web application, a desktop application, and a mobile application compatible with a computing device 1300. One possible embodiment of the software application may be provided by the camera app included on electronic devices such as smart phones and tablet computers.

As will be detailed with reference to FIG. 1 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

The computing device 1300 may be configured to communicate with each of client devices 1-3 over the network 110. Further, the computing device 1300 may be configured to provide a user interface to the user 105. Accordingly, the user 105 may interact with the computing device in order to manage a content capture session executable by one or more of the client devices 1-3. For example, the computing device 1300 may display a GUI to the user 105 in order to provide one or more session parameters for managing the content capture session. For instance, the one or more session parameters may indicate a selection of one or more of the client devices 1-3 to participate in a collaborative capture of content. As another instance, the one or more session parameters may indicate device settings for the client devices 1-3 to be used while capturing content. Accordingly, the one or more session parameters provided by the user 105 may then be transmitted to the client devices 1-3 over network 110.

Further, the GUI may enable the user 105 to enter commands corresponding to controlling capture of content such as for example, initiation of content capture, pausation of content capture and termination of content capture. Accordingly, a command entered by the user 105 may then be transmitted to the client devices 1-3 over network 110. Upon receiving the command, the client devices 1-3 may perform a content capturing operation dictated by one or more of the command and the one or more session parameters. Subsequently, the content captured by the client devices 1-3 may be transferred to the computing device 1300 over network 110. As a result, the user 105 may be able to consume the content recorded collaboratively in accordance with the one or more session parameters.

III. Platform Operation

The present disclosure relates to methods, systems and devices for capturing content using two or more electronic devices (collectively referred to as the collaborative content capturing platform). Examples of the two or more electronic devices include, but are not limited to, for example, still image camera, video camera, smart-phone, tablet computer, laptop computer, sound recorder and thermal imager. Further, an electronic device of the two or more electronic devices may include a content capturing means configured to capture content.

In general, the content may include a representation of one or more physical characteristics. For example, in some embodiments, the content may include visual content. Accordingly, the content may be a representation of optical characteristics such as, but not limited to, reflectance, transmittance, luminance and radiance. For instance, visual content corresponding to a scene may include electronic representation, such as, for example, a digital representation, of reflectance of visible light from one or more objects in the scene as captured from two or more viewpoints. Accordingly, the two or more electronic devices may be positioned at different spatial coordinates corresponding to the two or more viewpoints. Examples of content may include one or more of, but not limited to, image, video and audio. In various embodiments, the content may correspond to, but without limitation, one or more sensory modalities. The one or more sensory modalities may include visual modality, auditory modality, tactile modality, olfactory modality and gustatory modality.

In order to capture the content, the content capturing means may include one or more sensors configured for sensing one or more physical characteristics corresponding to the content. For example, the content capture means may include an image capturing device configured for sensing electromagnetic radiation in a scene and generating a corresponding electronic representation. Further, the image capturing device may be configured for sensing electromagnetic radiation corresponding to one or more wavelength bands. As an example, the image capturing device may be a video camera configured for sensing electromagnetic radiation in the visible spectrum. As another example, the image capturing device may be configured for sensing electromagnetic radiation in the infrared spectrum. In another embodiment, the content capturing means may include a microphone configured for sensing sound waves and generating a corresponding electronic representation such as, for example, a digital representation.

Figure 2:
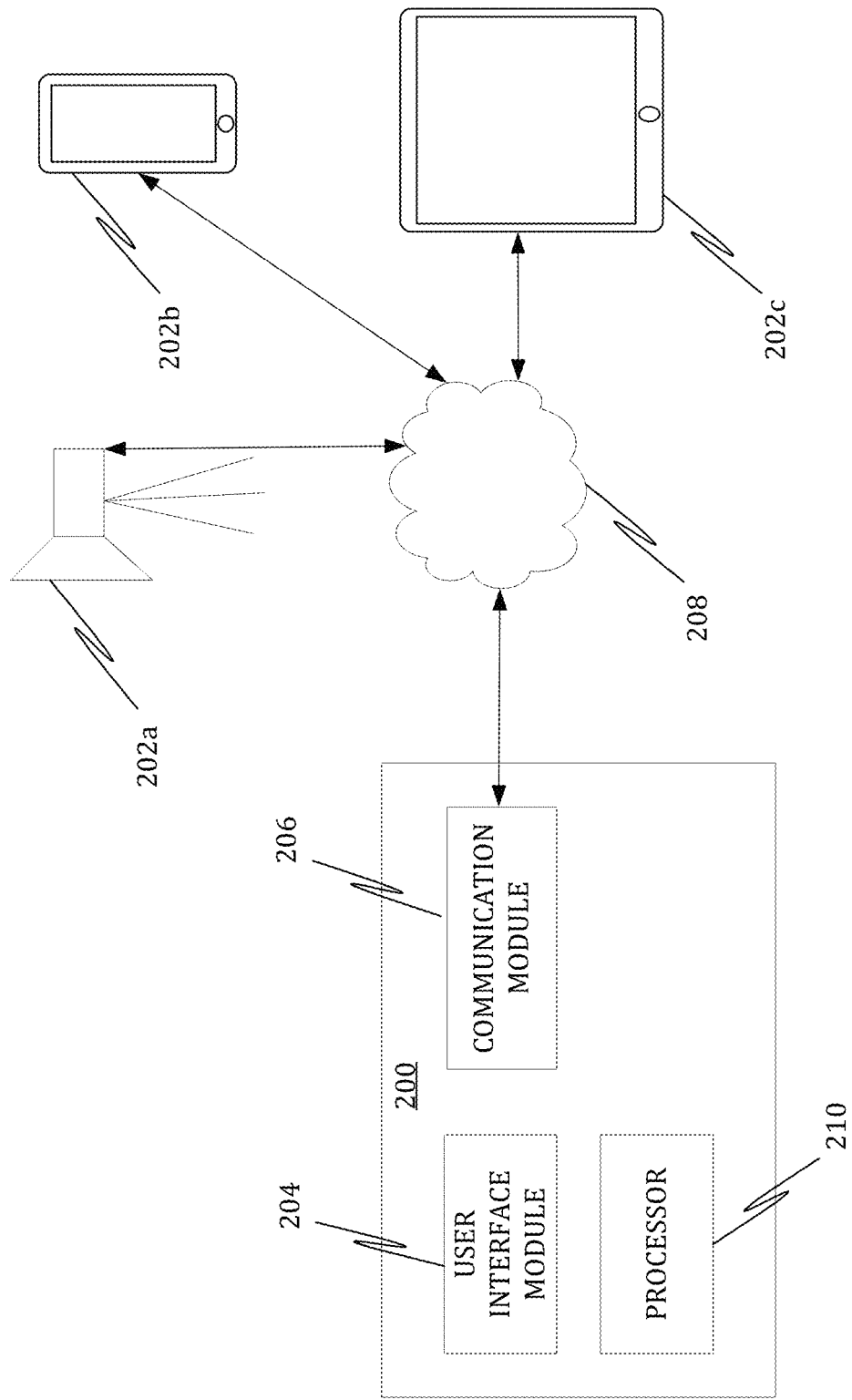
FIG. 2 illustrates a master electronic device configured to manage a content capture session executable by one or more client electronic devices according to various embodiments.

Referring to FIG. 2, a master electronic device 200 configured to be used for managing a content capture session executable by the two or more electronic devices is illustrated. In various embodiments, the master electronic device 200 may be configured to manage a content capture session executable by one or more client electronic devices 202, exemplarily illustrated as client electronic devices 202a, 202b and 202c. Each of the master electronic device 200 and the one or more client electronic devices 202 may be instances of the two or more electronic devices described earlier.

Further, in some embodiments, an electronic device of the two or more electronic devices may be interchangeably used as either the master electronic device 200 or the client electronic device 202. For instance, the master electronic device 200 may be configured to communicate a master-mode indicator to the client electronic device 202. Accordingly, subsequent to receiving the master-mode indicator, the client electronic device 202 may operate as the master electronic device 200.

Further, the two or more electronic devices may include each of the master electronic device 200 and the one or more client electronic devices 202. Accordingly, the master electronic device 200 may include content capturing means configured to capture content. In another embodiment, the two or more electronic devices may include two or more client electronic devices. Further, the master electronic device 200 may be configured to control capture of content using the two or more client electronic devices.

The master electronic device 200 may include a user interface module 204 configured to receive indication of one or more session parameters. In general, the user interface module 204 may be any means configured to receive input from one or more users. In various embodiments, the user interface module 204 may include a Graphical User Interface (GUI) presented on a display device, such as, a touchscreen. In another embodiment, the user interface module 204 may include an input device such as, but not limited to, a keyboard, a mouse, a touch-pad, a stylus, a digital pen, a voice recognition device, a gesture recognition device and a gaze detection device. In some embodiments, the user interface module 204 may be implemented using one or more of hardware and software. Examples of hardware include, but are not limited to, sensors and processors. Accordingly, in various embodiments, the indication of the one or more session parameters may include one or more of a touch on a GUI, a depression of a key, a mouse click on a GUI element, a gesture, a voice command and a gaze corresponding to the one or more session parameters.

In general, the one or more session parameters may represent any information that may be used to control a state of one or more of the master electronic device 200 and the one or more client electronic devices 202. In some embodiments, the one or more session parameters may represent any information that may control one or more of the master electronic device 200 and the one or more client electronic devices 202 in relation to capturing content. Further, in some embodiments, the one or more session parameters may represent information that characterizes one or more aspects of the content capture session. For instance, the one or more session parameters may represent information about which operation is to be performed, conditions under which the operation is to be performed and how the operation is to be performed. As an example, the one or more session parameters may represent information that may be used to enable or disable a functionality of one or more of the master electronic device 200 and the one or more client electronic devices 202. As another example, the one or more session parameters may represent information that may be used to trigger one or more of the master electronic device 200 and the one or more client electronic devices 202 to perform one or more operations.

In some embodiments, the one or more session parameters may include one or more device indicators. Further, the one or more client electronic devices 202 may be configured to participate in the content capture session based on the one or more device indicators. Accordingly, in some embodiments, the one or more device indicators may indicate one or more of the client electronic devices 202 that may participate in the content capture session. For instance, the one or more device indicators may include one or more device identifiers such as, for example, Electronic Serial Number (ESN), International Mobile Equipment Identity (IMEI) number, a network address, Internet Protocol (IP) address, Media Access Control (MAC) address, Bluetooth identity and Service Set Identifier (SSID). In another instance, the one or more device indicators may include one or more user identifiers corresponding to users of the one or more client electronic devices 202. Examples of user identifiers may include one or more of, but not limited to, first name, second name, middle name, pseudonym, nick-name, guest name and a contact such as a telephone number or an email address. Further, in some embodiments, a mapping of the one or more user identifiers to the one or more device identifiers may be maintained at one or more of the master electronic device 200, a server communicatively coupled to the master electronic device 200 and the one or more client electronic devices 202. Accordingly, the one or more device identifiers may be determined based on the one or more user identifiers.

Further, in some embodiments, a device indicator may be used for indicating which client electronic device of the one or more client electronic devices 202 may function as the master electronic device 200. For instance, each of the one or more client electronic devices 202 may receive a master-mode indicator along with the device indicator. Accordingly, the client electronic device corresponding to the device indicator may function as the master electronic device 200.

In some embodiments, the one or more session parameters may include one or more operation indicators. Further, the one or more client electronic devices 202 may be configured to perform one or more operations based on the one or more operation indicators. Similarly, in some embodiments, the master electronic device 200 may be configured to perform the one or more operations based on the one or more operation indicators. The one or more operations may be performable at various time instants in relation to capturing content. For instance, in some embodiments, the one or more operations may be performable prior to initiating capture of content. In some embodiments, the one or more operations may be performable during capture of content. In some other embodiments, the one or more operations may be performable subsequent to termination of capture of content.

Further, in some embodiments, the one or more operations may relate to an operational state of one or more of the master electronic device 200 and the one or more client electronic devices 202. The operational state may be one or more of, but not limited to, powered ON, powered OFF, online, offline, activated, deactivated, idle, standby and restart. Accordingly, in some embodiments, the one or more operations may be configured to modify the operational state of, for example, the one or more client electronic devices 202. For instance, the one or more session parameters may include a command configured to modify the operational state of the one or more client electronic devices 202 such as a CCTV camera from "idle" to "activated".

Additionally, in some embodiments, the one or more operations may relate to one or more device settings of one or more of the master electronic device 200 and the one or more client electronic devices 202. For instance, the one or more device settings may correspond to a configuration state of the one or more client electronic devices 202. In other words, the one or more device settings may determine one or more functional aspects of the one or more client electronic devices 202. Accordingly, in some embodiments, the one or more session parameters may include one or more camera settings. Accordingly, one or more of the master electronic device 200 and the one or more client electronic devices 202 may be configured to capture one or more images based on the one or more camera settings. For example, in case of the client electronic device 202a such as a stand-alone camera, the one or more device settings may determine one or more of, but not limited to, spatial resolution, frame rate, chromaticity, gamma value, zoom state, pan state, aperture size, shutter speed, focus state and type of digital filtering.

Furthermore, in some embodiments, the one or more operations may relate to capturing of content. For instance, the one or more operations may include, but are not limited to, one or more of initiation of content capture, pausation of content capture, termination of content capture and processing of content captured by the one or more client electronic devices 202.

In some embodiments, the one or more operations may relate to processing of captured content. For instance, in case of visual content, the processing may include operations such as, but not limited to, spatial transformations such as flipping, rotating, cropping etc., color transformations such as gray-scale conversion, color correction etc., resizing, filtering and special effects such as overlaying one content over another.

In some embodiments, the processing may include application of a special effect to a content stream captured by one or more of the master electronic device 200 and the one or more client electronic devices 202. For example, the special effects may include effects such as transforming a portion of a content stream.

Figure 3:
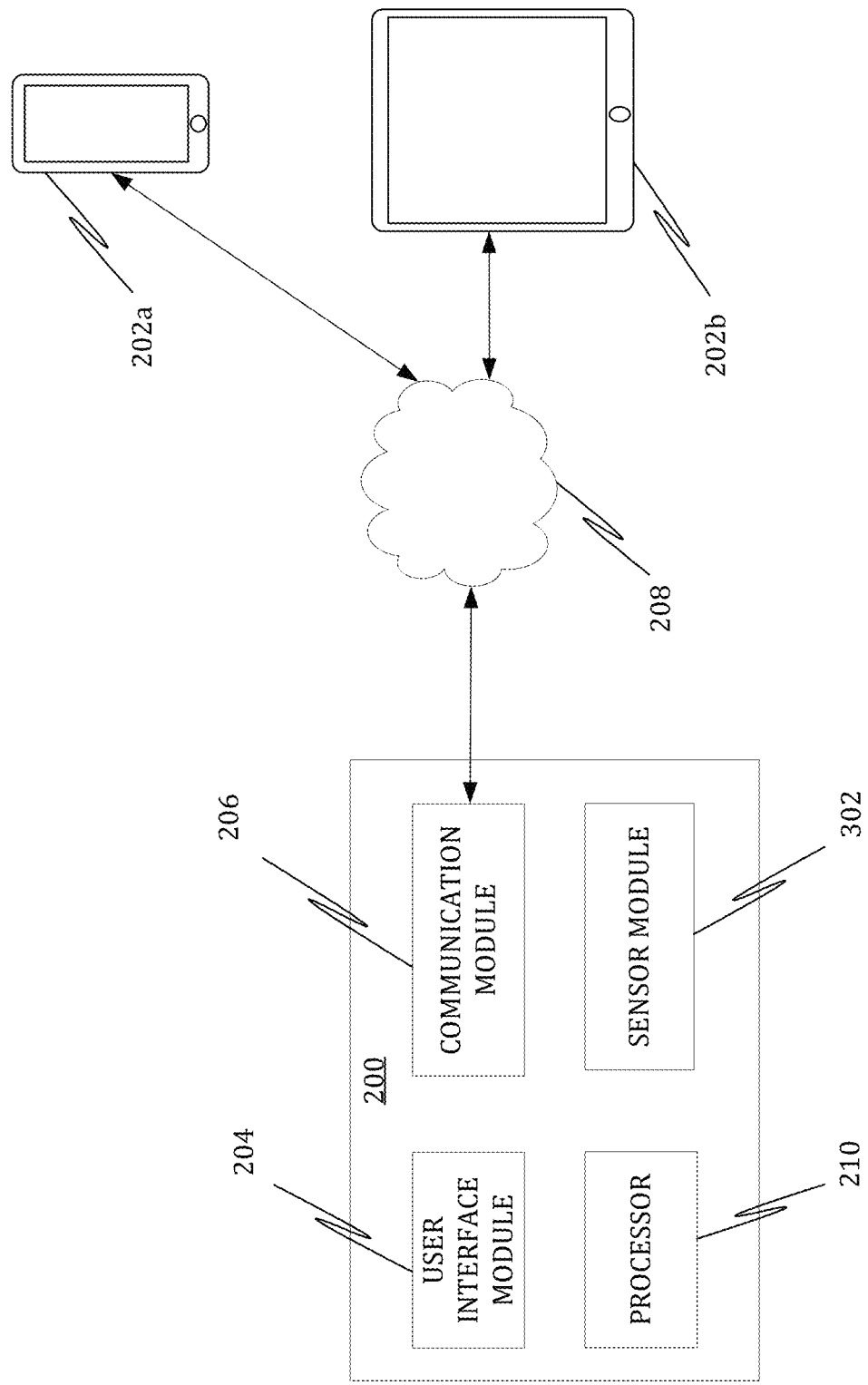
FIG. 3 illustrates a master electronic device configured to control capture of content using one or more client electronic devices according to various embodiments.

Further, in some embodiments, the one or more session parameters may include a context. Additionally, based on the context, one or more of the master electronic device 200 and the one or more client electronic devices 202 may be configured to perform the one or more operations. The context may generally include values corresponding to situational variables such as, but not limited to, time, place and one or more environmental conditions corresponding to one or more of the master electronic device 200 and the one or more client electronic devices 202. For example, the context may include range of coordinates of a region. Accordingly, the one or more client electronic devices 202 may be triggered to perform the one or more operations when the one or more client electronic devices 202 are located within the region. As another example, the context may include a range of time values. Accordingly, in various embodiments, each of the master electronic device 200 and the one or more client electronic devices 202 may be triggered to perform the one or more operations at the range of time values. As yet another example, the context may include a predetermined state of one or more sensors included in one or more of the master electronic device 200 and the one or more client electronic devices 202. For example, as illustrated in FIG. 3, the master electronic device 200 may include a sensor module 302 configured to sense one or more properties. In some embodiments, the one or more properties may include physical properties. As examples, the sensor module 302 may include one or more of, but not limited to, accelerometer, gyroscope, magnetometer, barometer, thermometer, proximity sensor, light meter and decibel meter.

Further, in some embodiments, the one or more session parameters may include one or more rules that may specify one or more conditions and corresponding one or more actions. The one or more actions may be performable by one or more of the master electronic device 200 and the one or more client electronic devices 202. For example, a rule may specify the one or more client electronic devices 202 to initiate capture of content upon detection of a moving object in the field of view of the one or more client electronic devices 202. As another example, a rule may specify initiation of capture of content by each of the master electronic device 200 and the one or more client electronic devices 202 upon detection of a predetermined object in the field of view of each of the master electronic device 200 and the one or more client electronic devices 202.

Additionally, in some embodiments, the one or more session parameters may include a storage setting. Accordingly, one or more of the master electronic device 200 and the one or more client electronic devices 202 may be configured to store content captured by one or more of the master electronic device 200 and the one or more client electronic devices 202 based on the storage setting. In general, the storage setting may determine how any storage related operation may be performed. In some embodiments, the storage setting may specify a storage format to be used in storing content captured by, for example, the one or more client electronic devices 202. The storage format may include an encoding format to be used. Examples of the encoding format may include, but are not limited to, MPEG-2 Part 2, MPEG-4 Part 2, H.264 (MPEG-4 Part 10), HEVC, Theora, Dirac, RealVideo RV40, VP8, and VP9. Additionally, in some embodiments, the storage setting may specify an encryption format to be used in storing the captured content for enhanced security. Further, in some embodiments, the storage setting may also specify one or more storage locations where captured content may be stored. The one or more storage locations may in some embodiments be within a local storage device included in the master electronic device 200 or the one or more client electronic devices 202. In some other embodiments, the one or more storage locations may be within a remote storage device such as a cloud server. Further, in some embodiments, the storage setting may specify file names to be used in storing the captured content. Additionally, in some embodiments, the storage setting may specify a storage size limit for storing captured content. Accordingly, in some embodiments, the one or more client electronic devices 202 may store captured content in such a way that the size of the captured content does not exceed the storage size limit. For example, the one or more client electronic devices 202 may reduce size of the captured content using lossy compression or lossless compression in order to satisfy the storage size limit.

Further, in some embodiments, the one or more session parameters may include a privacy setting. Accordingly, one or more of the master electronic device 200 and the one or more client electronic devices 202 may be configured to restrict access to content captured by one or more of the master electronic device 200 and the one or more client electronic devices 202 based on the privacy setting. For instance, the privacy setting may include an access control policy to be enforced on the content captured by the one or more client electronic devices 202. Accordingly, in some embodiments, only a "director" operating the master electronic device 200 may have access to content captured by the one or more client electronic devices 202. Further, according to the access control policy, a "camera person" operating the client electronic device 202b may not be allowed to access content captured by the client electronic device 202c.

Furthermore, in some embodiments, the one or more session parameters may include a transmission setting. Accordingly, one or more of the master electronic device 200 and the one or more client electronic devices 202 may be configured to transmit content captured by one or more of the master electronic device 200 and the one or more client electronic devices 202 based on the transmission setting. In general, the transmission setting may specify how any transmission related operation may be performed. For instance, the transmission setting may specify one or more destinations for the transmission. For example, the transmission setting may specify that content captured by the one or more client electronic devices 202 may be transmitted to the master electronic device 200. Alternatively, in some embodiments, the transmission setting may specify that the content captured by the one or more client electronic devices 202 may be transmitted to a cloud server. Additionally, in some embodiments, the transmission setting may also specify a time for performing a transmission. For instance, the transmission setting may specify that the content captured by the client electronic device 202b may be transmitted subsequent to transmission of content captured by the client electronic device 202a. Further, in some embodiments, the transmission setting may specify a transmission format to be used. For example, the transmission format include an encoding format such as, but not limited to, MPEG-2 Part 2, MPEG-4 Part 2, H.264 (MPEG-4 Part 10), HEVC, Theora, Dirac, RealVideo RV40, VP8, and VP9. Additionally, in some embodiments, the transmission setting may specify one or more of an encryption format and a compression format to be used prior to performing the transmission. For example, the transmission setting may specify the content captured by the one or more client electronic devices 202 to be compressed and encrypted using a secret encryption key prior to being transmitted to the master electronic device 200.

As illustrated in FIG. 2, the master electronic device 200 may further include a processor 210 configured to create one or more content capture sessions based on the one or more session parameters. For instance, the one or more session parameters may indicate one or more client electronic devices 202, one or more operations related to content capture, and one or more time instants when the one or more operations are to be performed. Accordingly, the processor 210 may be configured to create a content capture session executable by the one or more client electronic devices 202 configured to perform the one or more operations at the one or more time instants.

Further, the master electronic device 200 may include a communication module 206 configured to communicate data between the master electronic device 200 and the one or more client electronic devices 202. The communication may include transmission of the one or more session parameters. Accordingly, the one or more client electronic devices 202 may be configured to participate in the one or more content capture sessions based on the one or more session parameters.

Additionally, the communication module 206 may be configured to communicate data over one or more communication channels 208. Accordingly, the one or more client electronic devices 202 may include corresponding one or more communication modules configured to communicate over the one or more communication channels 208.

The one or more communication channels 208 may include one or more of a common local-area-network connection, a Wi-Fi connection, and a Bluetooth connection. For example, the communication module 206 may include a Bluetooth transceiver configured to perform one or more of transmission and reception of data over a Bluetooth communication channel. As another example, the communication module 206 included in the master electronic device 200 such as, for example, a smart-phone, may be a cellular transceiver configured to perform one or more of transmission and reception of radio frequency signals over a cellular communication network. As yet another example, the communication module 206 may include a network interface module configured for communicating over a packet switched network such as, for example, the Internet. In various embodiments, each of the master electronic device 200 and the one or more client electronic devices 202 may be configured to communicate over an ad-hoc wireless network. Accordingly, the master electronic device 200 may be configured to transmit a request to the one or more client electronic devices 202 to form the ad-hoc wireless network. In various embodiments, the master electronic device 200 may communicate data with the one or more client electronic devices 202 over a personal area network (PAN).

In various embodiments, the communication of data between the master electronic device 200 and the one or more client electronic devices 202 may include wireless transmission of the one or more session parameters to the one or more client electronic devices 202. Accordingly, the communication module 206 included in the master electronic device 200 may be configured to perform one or more of transmission and reception of electromagnetic waves.

In various embodiments, the communication module 206 may be configured for wireless transmission of the one or more session parameters to each client electronic device of the one or more client electronic devices 202. In another embodiment, the communication module 206 may be configured for wireless transmission of the one or more session parameters to a first client electronic device of the one or more client electronic devices 202. Further, the first client electronic device may be configured for transmission of the one or more session parameters to a second client electronic device of the one or more client electronic devices 202. In yet another embodiment, the communication module 206 included in the master electronic device 200 may be configured to communicate with the one or more client electronic devices 202 to a server. In other words, the master electronic device 200 may be configured to communicate data to the server. Further, the server may be configured to communicate the data to the one or more client electronic devices 202.

In another embodiment, the communication module 206 included in the master electronic device 200 may be configured for reception of content captured by the one or more client electronic devices 202. Accordingly, the one or more client electronic devices 202 may be configured for transmission of content captured by the one or more client electronic devices 202. In an instance, the communication module 206 included in the master electronic device 200 may be configured for reception of content captured by the one or more client electronic devices 202 by communicating with a server. Accordingly, the one or more client electronic devices 202 may be configured for transmission of the content captured by the one or more client electronic devices 202 to the server. As an example, each of the one or more client electronic devices 202 such as, for example, smart phones may be configured to capture content based on the one or more session parameters received from the master electronic device 200. Further, the one or more client electronic devices 202 may be configured for transmission of the captured content to a cloud server. Furthermore, the master electronic device 200 may be configured to communicate with the cloud server in order to receive the content captured by the one or more client electronic devices 202.

In some embodiments, the one or more session parameters may include a time value. In general, the time value may be any value based on time. In various embodiments, the time value may indicate one or more instants of time. In another embodiment, the time value may indicate a period of time, such as for example, a duration spanning a start time and an end time.

In an instance, the time value may include a standard time value. The standard time value may be a time value maintained by a time measuring device external to each of the master electronic device 200 and the one or more client electronic devices 202. For example, the standard time value may be maintained by a time keeping device at a national or an international scientific organization. The standard time value may be expressed in units of time such as, but not limited to, year, month, day, hour, minute and second. An example of the standard time value may be 2017, Jan. 1, 10 am.

In another instance, the time value may be a relative time value. The relative time value may be in relation to common time value available to each of the master electronic device 200 and the one or more client electronic devices 202. In an instance, the common time value may be the standard time value. In various embodiments, the standard time value may be maintained by a communication service provider, such as, for example, a cellular communication provider. Accordingly, in various embodiments, each of the master electronic device 200 and the one or more client electronic devices 202 may be configured to receive the standard time value from the cellular communication provider. Further, the relative time value may be expressed in units of time such as, for example, minutes or seconds in relation to the standard time value. In other words, in various embodiments, each of the master electronic device 200 and the one or more client electronic devices 202 may be synchronized to the common time value, such as the standard time value. Accordingly, the relative time value may represent a time differential in relation to the common time value.

Figure 4:
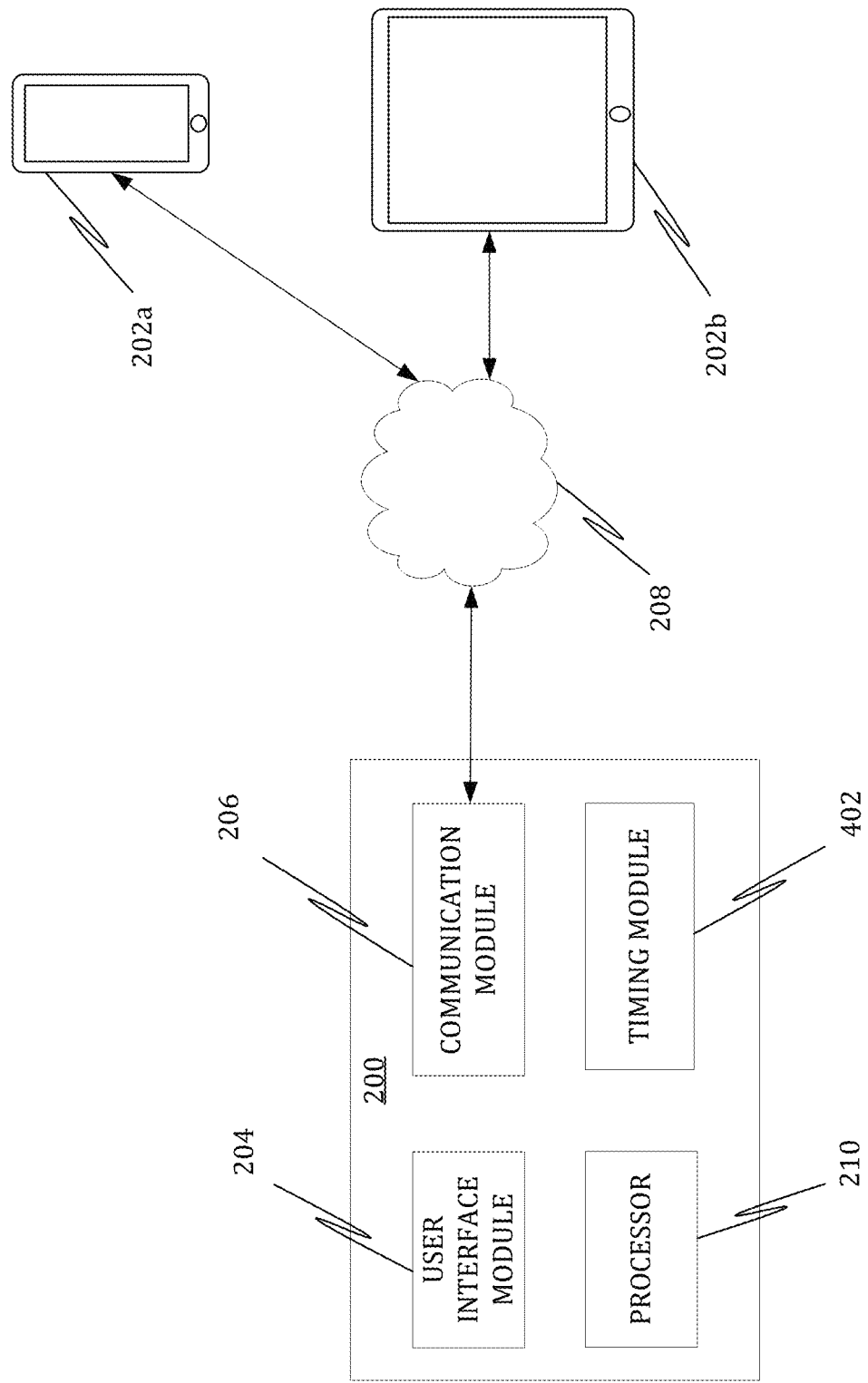
FIG. 4 illustrates a master electronic device configured to control capture of content using one or more client electronic devices according to various embodiments.
Figure 8:
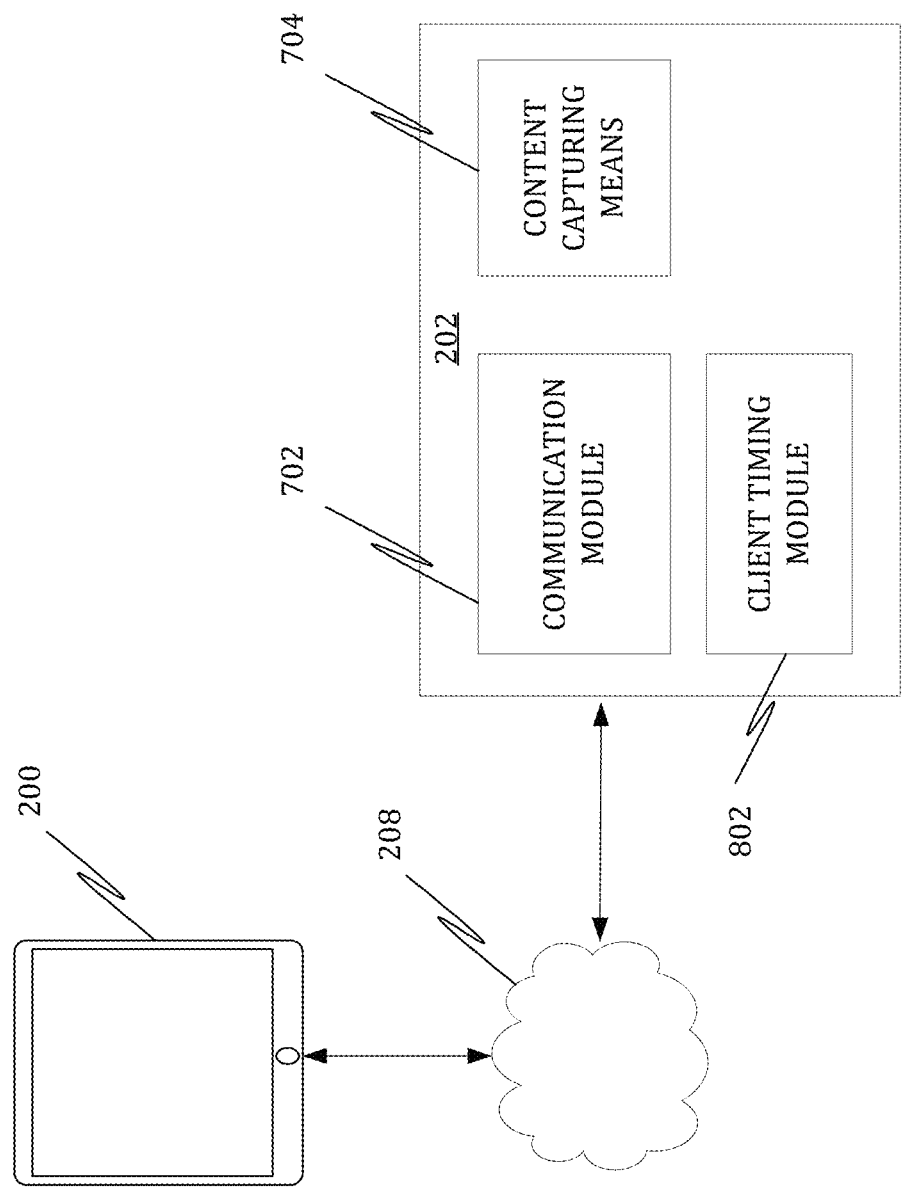
FIG. 8 illustrates a client electronic device configured to capture content based on one or more session parameters according to various embodiments.

In various embodiments, the master electronic device 200 may include a master timing module 402 configured for measuring time as illustrated in FIG. 4. In an instance, the master timing module 402 may include each of a crystal oscillator and a digital counter. The crystal oscillator may be configured for generating a periodic signal of a predetermined frequency. The digital counter may be configured to count a number of pulses in the periodic signal. In various embodiments, the master timing module 402 may be implemented in the form of firmware included in the master electronic device 200. For example, a smart-phone may include a dedicated timer circuitry configured for measuring time. In another embodiment, the master timing module 402 may be implemented in the form of a general purpose processor included in the master electronic device 200, such as, for example, a processor of a smart-phone. Accordingly, in an instance, the time value may include an output of the master timing module 402, such as, for example, the output of the digital counter. Further, the one or more client electronic devices 202 may include a client timing module 802 configured for measuring time as illustrated in FIG. 8. The client timing module 802 may be implemented in a manner similar to that of the master timing module. Further, the client timing module 802 may be configured to be synchronized with the master timing module 402 based on the time value.

Figure 11:
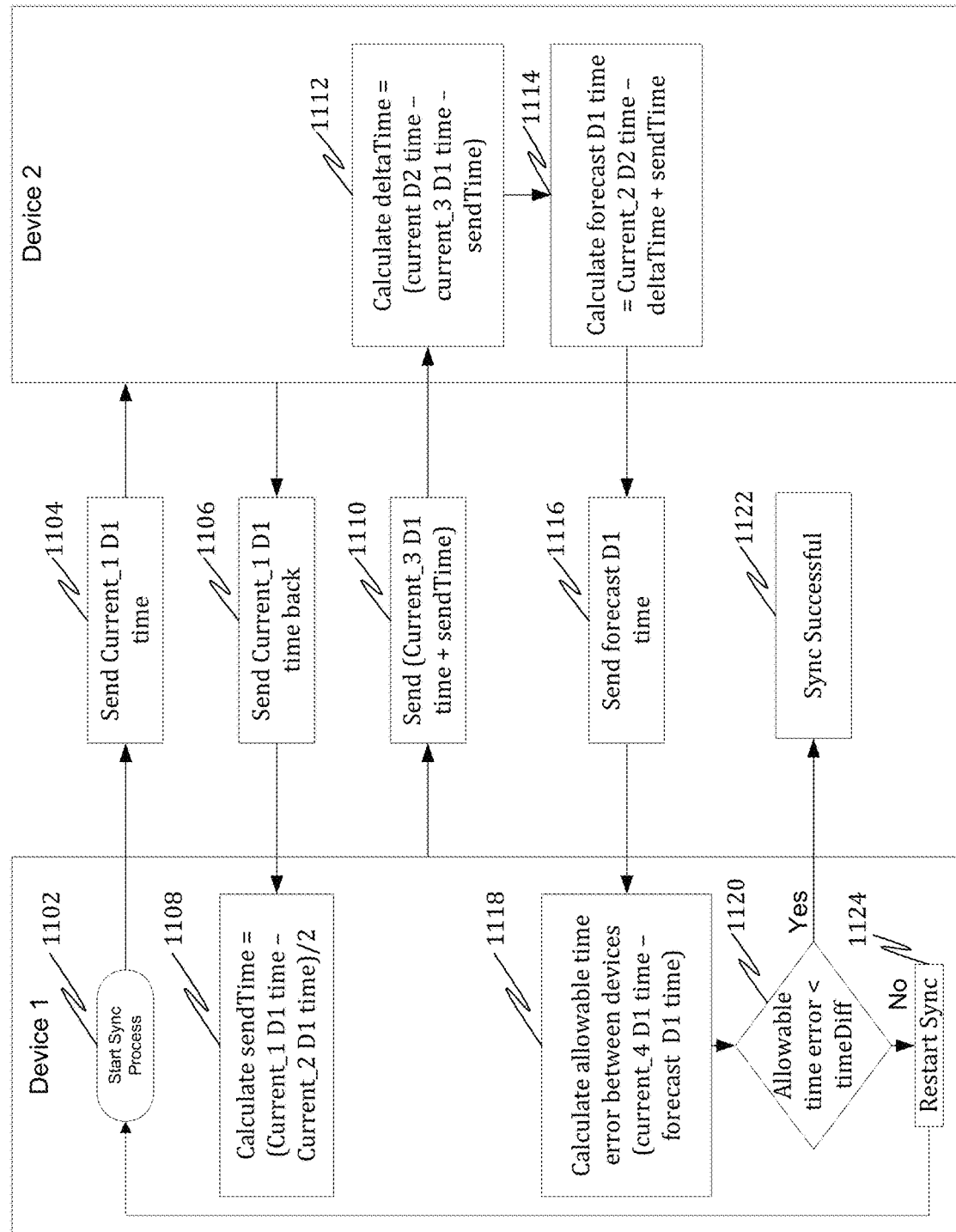
FIG. 11 illustrates a flowchart of a method of synchronizing two electronic devices according to various embodiments.

In some embodiments, the master electronic device 200 may synchronize with the client electronic device 202 using a sync process as illustrated in FIG. 11. The master electronic device 200 is represented as "Device 1" while the client electronic device 202 is represented as "Device 2". At step 1102, the sync process may begin. Accordingly, at step 1104, Device 1 may transmit its current time value represented as Current_1 D1 time to Device 2. Subsequently, Device 2 may receive and transmit the Current_1 D1 time back to Device 1 at step 1106. Thereafter, at step 1108, Device 1 may calculate a sendTime based on a difference between Current_1 D1 time and Current_2 D1 time, where Current_2 D1 time may be time of reception of Current_1 D1 time from Device 2. Subsequently, at step 1110, Device 1 may transmit a (Current_3 D1 time+sendTime) to Device 2, where Current_3 D1 time is a current time later than Current_2 D1 time measured at Device 1. Thereafter, at step 1112, Device 2 may be configured to calculate a deltaTime based on difference between Current D2 time and (Current_3 D1 time+sendTime). Subsequently, at step 1114, a forecast D1 time may be calculated based on (Current_2 D2 time-deltaTime+sendTime). Further, at step 1116, the forecast D1 time may be transmitted to the Device 1. Subsequently, at step 1118, an allowable time error between Device 1 and Device 2 may be calculated based on (current_4 D1 time-forecast D1 time). Thereafter, at step 1120, the allowable time error is compared to a predetermined tolerance value represented as timeDiff. If the allowable time error is less than timeDiff, the process proceeds to step 1112 where the sync process is determined to be successful. However, if the allowable time error is greater than timeDiff, the process proceeds to step 1124 where the sync process is restarted again beginning from step 1102.

Furthermore, in various embodiments, based on the time value, each of the master electronic device 200 and the one or more client electronic devices 202 may be configured to capture content synchronously. For example, the time value may indicate a time in future when each of the one or more client electronic devices 202 is instructed to capture content of a scene from corresponding viewpoints. Further, the master electronic device 200 may also capture content of the scene from a different viewpoint starting from the time. Accordingly, each of the master electronic device 200 and the one or more client electronic devices 202 may capture content of the scene at the same time but from different viewpoints.

Figure 5:
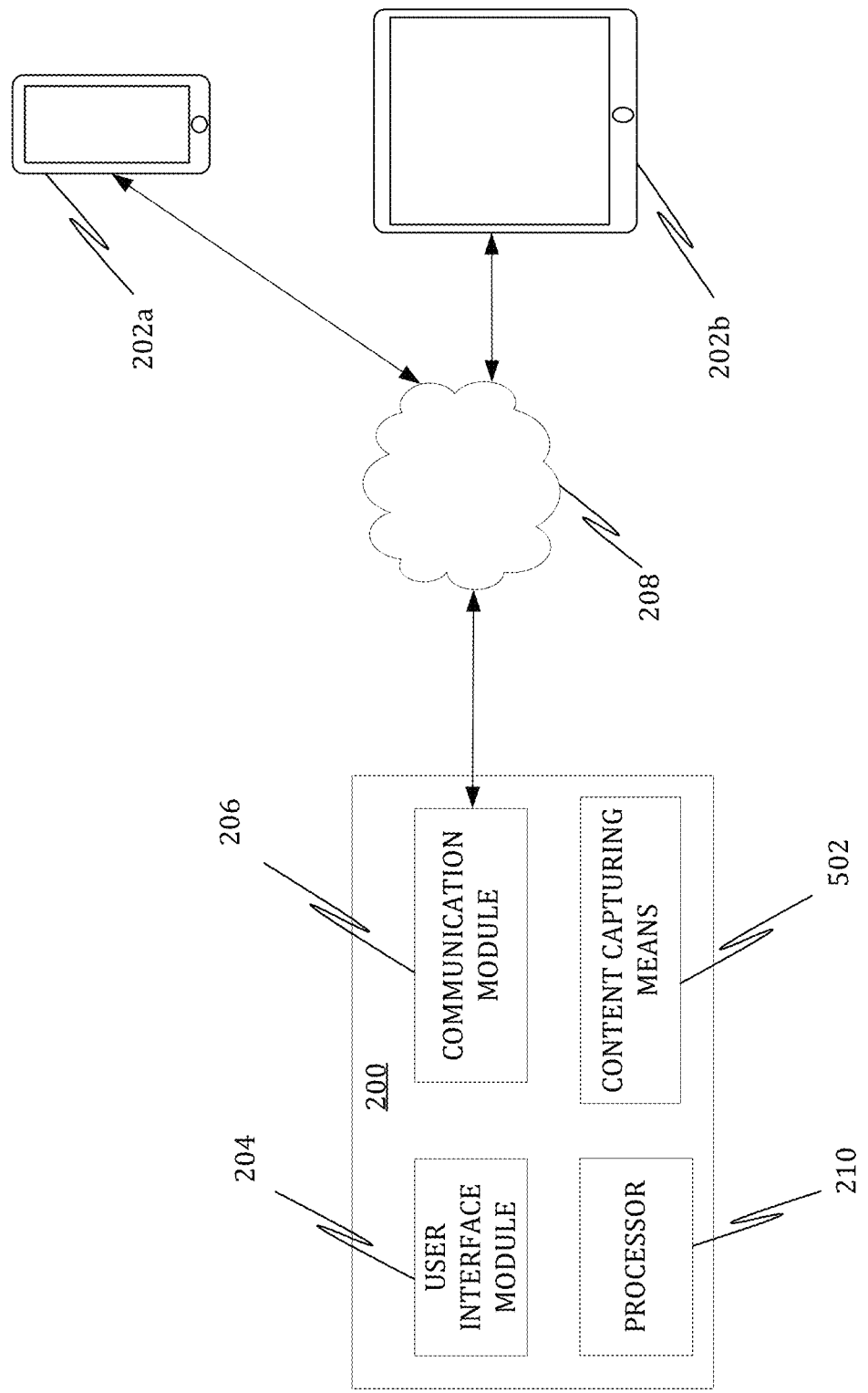
FIG. 5 illustrates a master electronic device configured to control capture of content using one or more client electronic devices according to various embodiments.

In some embodiments, the master electronic device 200 may include a content capturing means 502 configured to capture content as illustrated in FIG. 5. For instance, the master electronic device 200 may include one or more of an image capturing device such as, for example, a camera and a sound capturing device such as, for example, a microphone. Further, in various embodiments, the communication module 206 included in the master electronic device 200 may be configured for wireless transmission of content captured by the master electronic device 200.

Figure 9:
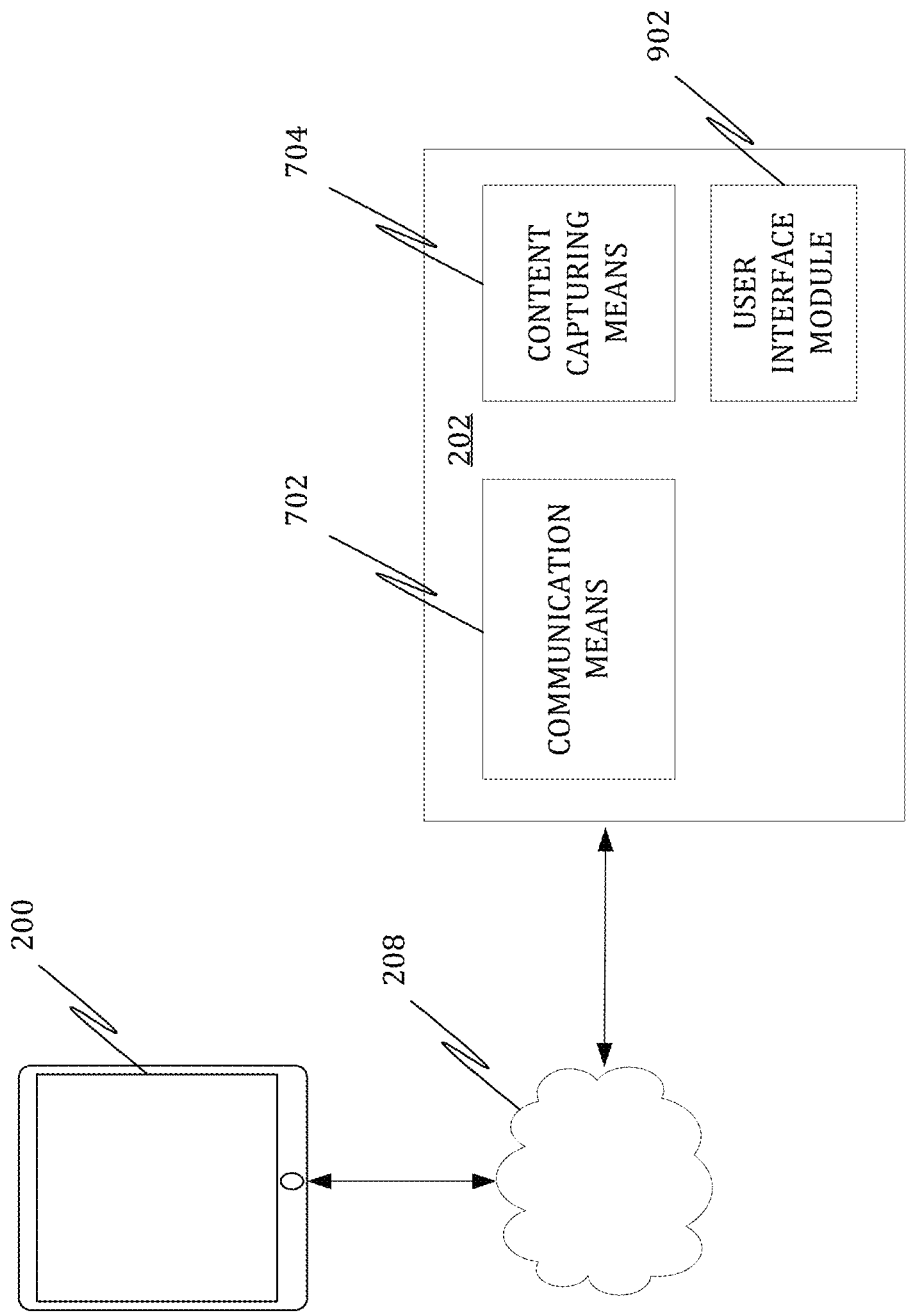
FIG. 9 illustrates a client electronic device configured to capture content based on one or more session parameters according to various embodiments.

In various embodiments, the user interface module 204, included in the master electronic device 200, may be further configured to receive an invite input. Accordingly, the communication module 206 may be further configured for wireless transmission of an invitation to the one or more client electronic devices 202 based on the invite input. The invitation may correspond to a request to join the content capture session. In various embodiments, the content capture session may include the one or more client electronic devices 202. Further, the one or more client electronic devices 202 may be configured for reception of the invitation. Furthermore, the one or more client electronic devices 202 may be configured to receive an accept-invite input through a user interface module 902 included in the one or more client electronic devices 202 as illustrated in FIG. 9. As a result, in an instance, a user of the master electronic device 200, such as a first smart-phone, may provide the invite input through the user interface module 204 included in the first smart phone. The invite input may be provided through a user interface such as a touch screen of the first smart phone. Accordingly, the invitation to capture content may be transmitted to the one or more client electronic devices 202, such as a second smart-phone. Further, the invitation may be presented on a user interface, such as a touch screen, on the second smart-phone. Subsequently, a user of the second smart phone may accept the invitation by providing an accept-invite input through the user interface of the second smart phone. Consequently, each of the first smart phone and the second smart phone may be able to capture content collaboratively based on the one or more session parameters. For instance, each of the first smart phone and the second smart phone may be able to capture content of a scene synchronously from different viewpoints.

Figure 6:
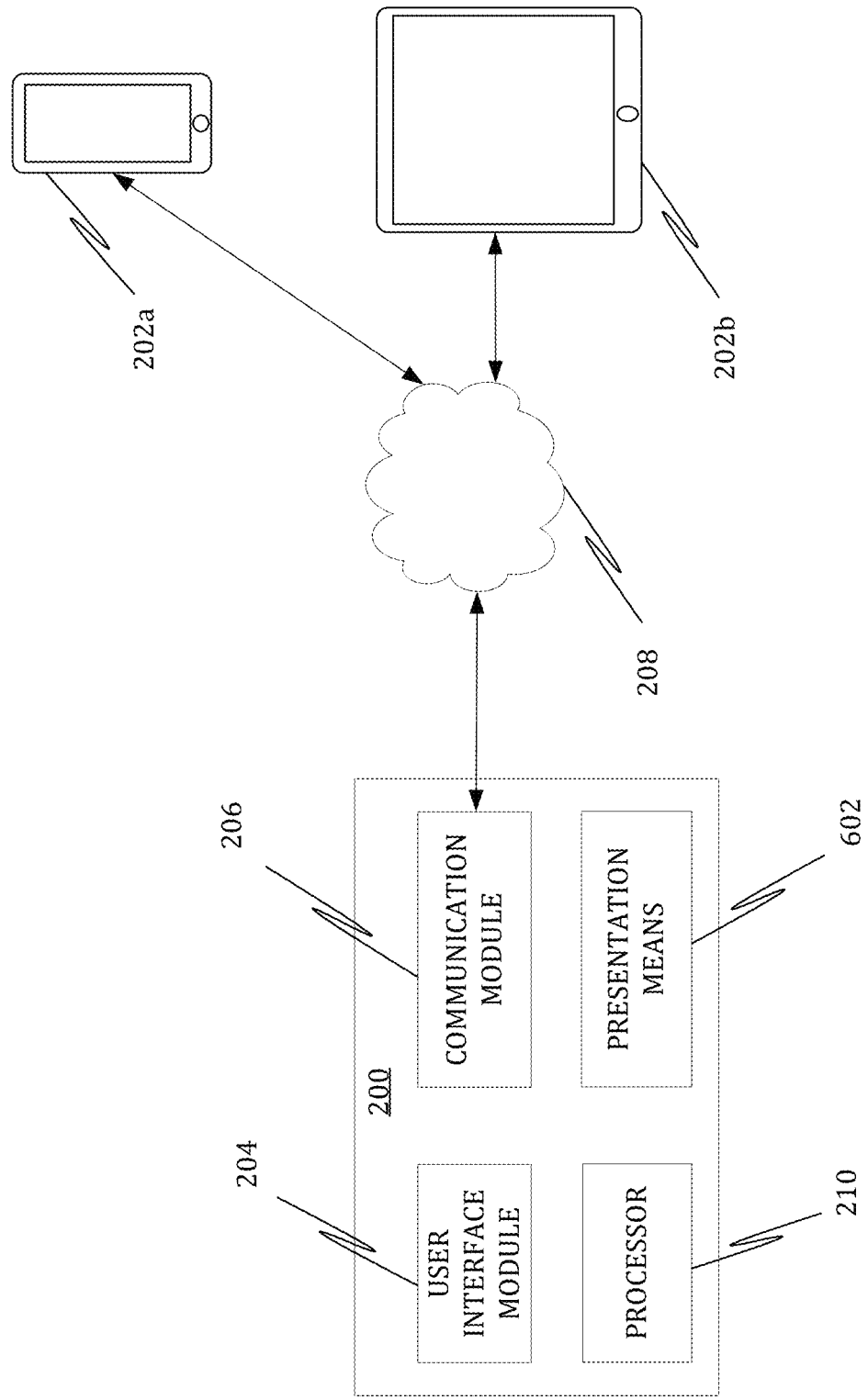
FIG. 6 illustrates a master electronic device configured to control capture of content using one or more client electronic devices according to various embodiments.

In some embodiment, the master electronic device 200 may include a presentation means 602 configured to present content captured by one or more of the master electronic device 200 and the one or more client electronic devices 202 as illustrated in FIG. 6. For instance, the master electronic device 200 may be a smart phone including a touch screen display configured to display content such as, for example, video captured by the one or more client electronic devices 202 such as tablet computers. Further, the touch screen display may be configured to concurrently display each of video captured by the smart phone and video captured by the tablet computers. For instance, the smart phone may be configured to display video captured by the smart phone on a first display region of the touch screen display and concurrently display video captured by the tablet computers on a second display region of the touch screen display. As a result, a user of the master electronic device 200 may be able to view a scene captured from different viewpoints.

In some embodiments, the presentation means may be embodied as a playback module configured to play back each of the content captured by the one or more client electronic devices 202 and the content captured by the master electronic device 200. Alternatively, in another embodiment, the presentation means, embodied as the playback module, may be configured to play back content captured by two or more client electronic devices 202. Further, the playback may include a synchronized playback of a plurality of content streams. In other words, in some embodiments, the synchronized playback includes playing each content stream of the plurality of content streams according to a common timeline associated with each content stream. For instance, the common timeline may be the timeline during which each of the content streams was captured by the two or more client electronic devices 202.

In some embodiments, the playback module may also be configured for decoding content prior to playing it. For instance, the content captured by the one or more client electronic devices 202 may be a video encoded in a predetermined format such as MPEG. Accordingly, the playback module may include an MPEG decoder for decoding the video. In general, the playback module may be implemented using one or more of, but not limited to, a processor and a presentation device, such as for example, a display device and an audio speaker.

Additionally, in some embodiments, the playback module may include software, such as a media player, configured for playing content. In some embodiments, such a media player may be termed as a multi-view player or a multi-view player. Accordingly, the multi-view player may be configured to read a multi-view file containing content captured by one or more of the master electronic device 200 and the one or more client electronic devices 202. In some embodiments, the multi-view file may include a header indicating a number of content streams present in the multi-view file and corresponding time-lines. For instance, the header may indicate each of a start time and an end time corresponding to content captured by client electronic device 202a. Further, in some embodiments, the header may also indicate a region on a display screen corresponding to each of the content streams present in the multi-view file. Accordingly, the multi-view player may be configured to render each of the content streams on corresponding regions of a display screen.

Figure 14:
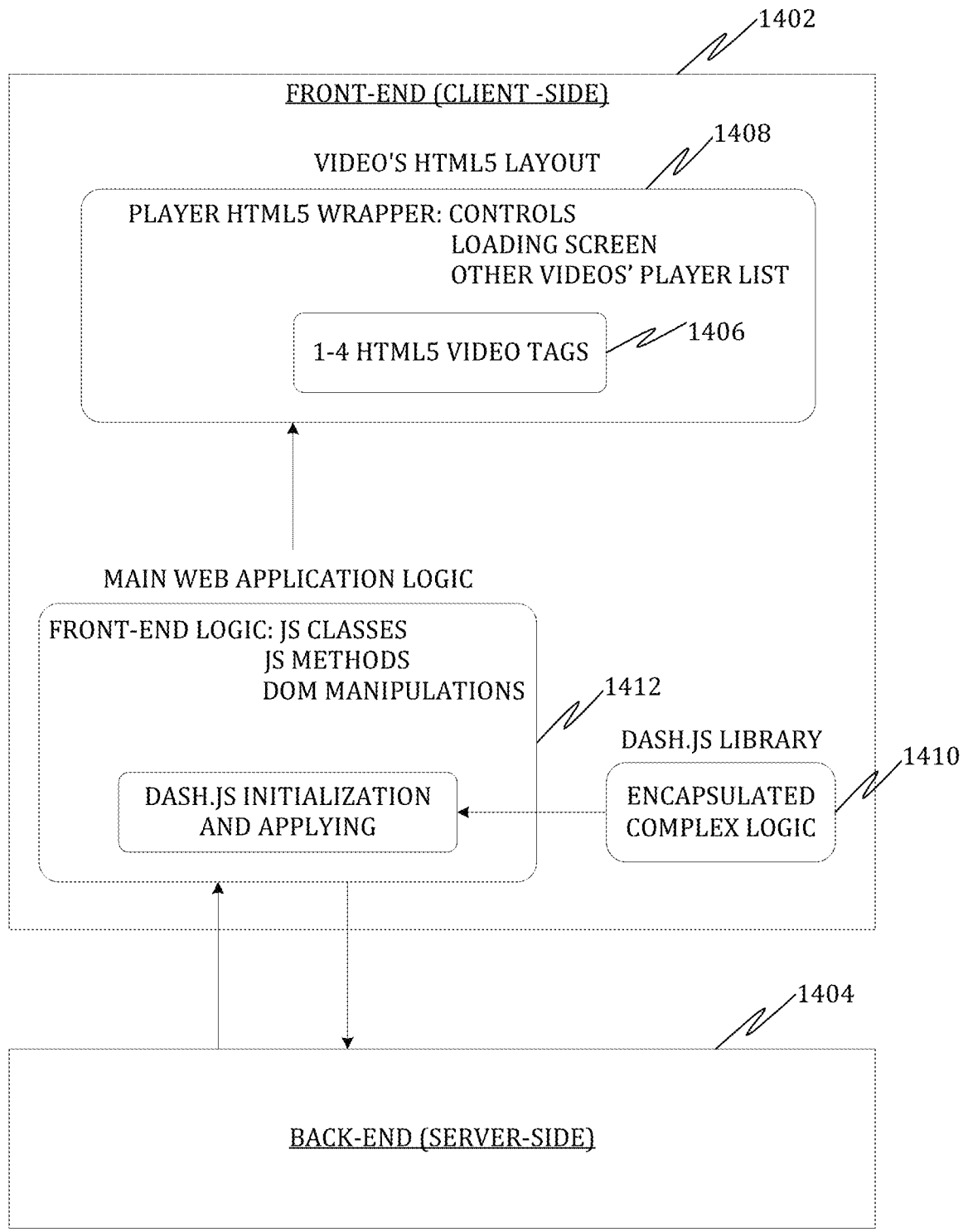
FIG. 14 is a block diagram illustrating the logical subsystems of a multi-view video player according to some embodiments.

FIG. 14 is a block diagram illustrating the logical subsystems of a multi-view video player according to some embodiments. The multi-view video player may allow users watching multi-view videos on the web or a mobile device to easily switch between multiple camera views instantly. Accordingly, users may be enabled to choose the angles from which they may wish to watch a multi-view video.

In some embodiments, the multi-view video player may be implemented using custom application code executable on a web server or a mobile device. Further, the web server or the mobile device may be in communication with a video hosting infrastructure in order to receive the multiple video streams corresponding to the multi-view video in a synchronized manner.

As shown in FIG. 14, the multi-view video player may include of a front-end code 1402 executable on client side, a back-end code 1404 executable on server side and a database (not shown in figure) including table structure and content.

The front-end may be the client side logic that is used directly by the users. The client side logic allows users to watch videos of a particular action recorded from different angles of view. In some embodiments, the multi-view video player may support up to four videos. Further, a viewer may switch among the four videos without any loss of quality and/or download progress. The multi-view video player may support streaming technology, which gives additional convenience for users in their interaction with the multi-view video player.

In some embodiments, the front-end may include a HTML layout for the multi-view video player which may consist of HTML5 video tags 1406. In some embodiments, the HTML5 video tags 1406 may be in the range of 1 to 4 in number. Further, the HTML5 video tags 1406 may be wrapped by other HTML player elements 1408, such as, but not limited to, control bar, loading screen and non-active videos list.

Further, for every action of the multi-view video player, the front-end may include grouped logic which may be applied to all videos at the same time and for the multi-view video player globally. For example, the group logic may correspond to actions such as, start all videos, pause all videos, check buffer for synchronization, and switch between videos.

Additionally, the front end may include logic for single group which may implement adding and removing event listeners of a specific video, changing sound level and controlling full screen mode.

Furthermore, video synchronization may be implemented by checking the buffer size of every video. If one of the videos has value less than a minimum, the multi-view video player may mark the video as inactive and deactivate all corresponding videos.

Still consistent with embodiments of the present disclosure, the front end may include a streaming implementation based on a third party library such as, for example, Dash.js. Information regarding this library may be found at the following URL: https://github.com/Dash-Industry-Forum/dash.js/wiki. The library may enable decoding of streaming information from a web server and translating the decoded data into data appropriate for HTML5 video.

Further, the library may allow creation of an object encapsulating complex logic 1410. At creation time, HTML5 video players may be accepted by the encapsulated complex logic 1410 and all methods may be initialized for proper working. Further, the initialized object may be added to the main front-end logic 1412 in order to control video processes such as, but not limited to, play, pause, seek, etc.

Figure 15:
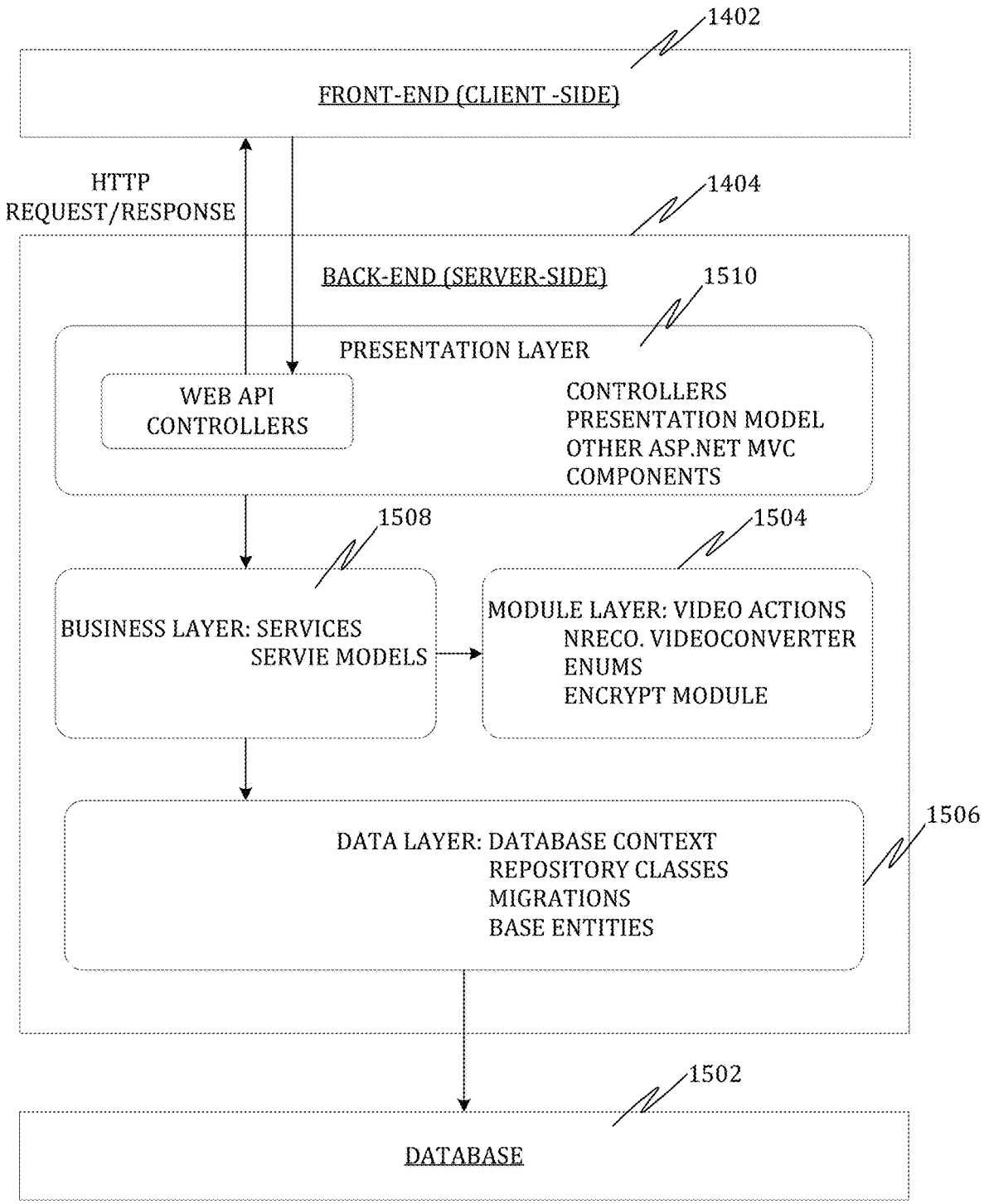
FIG. 15 is a block diagram illustrating the logical subsystems of a backend of a multi-view video player according to some embodiments.

FIG. 15 is a block diagram illustrating the logical subsystems of the backend 1404 of a multi-view video player according to some embodiments. The backend 1404 may be configured to accept incoming requests from the client side, process the incoming requests and store any needed data into a database 1502.

In some embodiments, the back-end may include five logical layers for performing corresponding functions. Accordingly, the back-end may include a Module Layer 1504 containing all third party modules. For example, an Azure Media Encoder may be included to provide code to upload and create encoding tasks for Azure Media Service. The Azure Media Service may provide functionality of encoding a user's video into streaming data and storing it on the cloud. As another example, a Video Actions module for converting an uploaded video to mp4 may also be included. The Video Actions module may utilize NReco.VideoConverter, whose details may be found at the following URL: http://www.nrecosite.com/doc/NReco.VideoConverter.

Further, the back-end 1404 may include a Data Layer 1506 providing an interface to the database 1502. The Data Layer 1506 may consist of database scheme that allows for storage of data such as, for example, user permissions, video session information, specific video information, etc.

Additionally, the Data Layer 1506 may include a Repository Layer consisting of a class structure for interaction between the database 1502 and Business Layer 1508. Each class may be used to access a certain database part and may allow performing all CRUD (Create, Remove, Update, Delete) operations.

The Business Layer 1508 may contain classes for performing the main server logic. The Business Layer 1508 may be configured to obtain data from a Presentation layer 1510, processes the data and call methods from the Repository Layer.

The Presentation Layer 1510 may be a web application for receiving data from a client. The Presentation Layer 1510 may include API controllers configured to create RESTful API. Accordingly, a client may be enabled to access the web server by sending a particular HTTP request.

Figure 10:
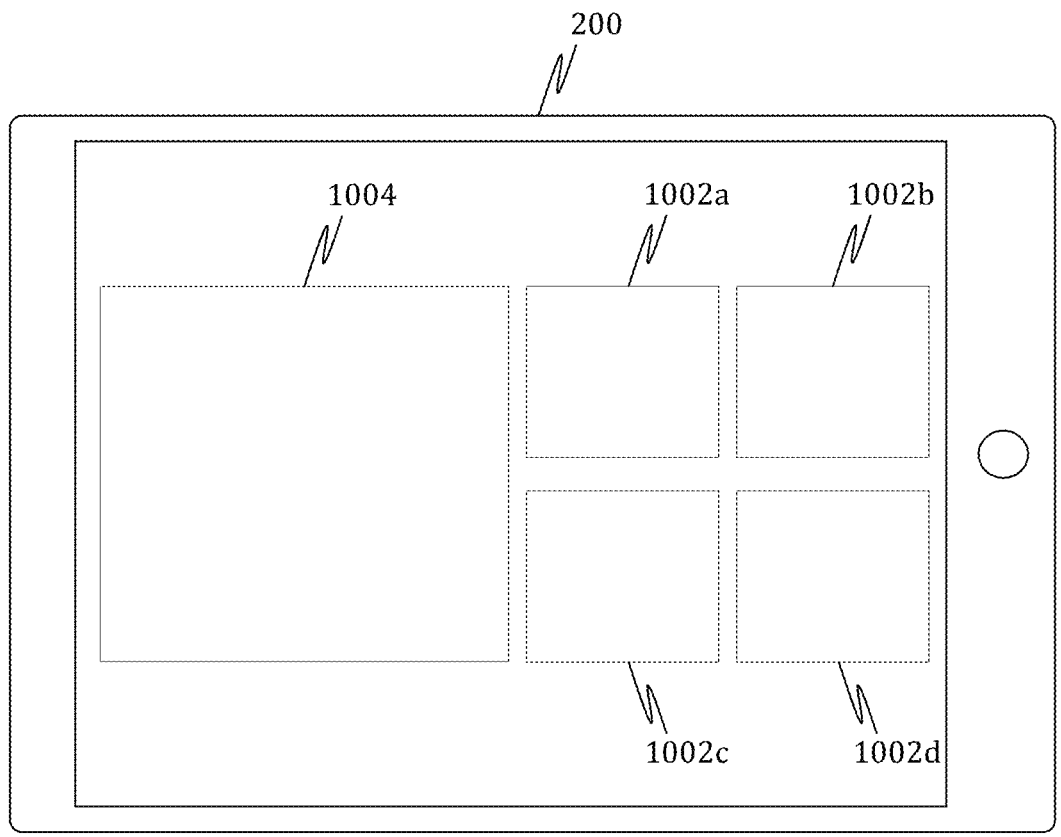
FIG. 10 illustrates a display screen of an electronic device for displaying content captured by a plurality of electronic devices according to various embodiments.

In some embodiments, the playback module may be further configured to playback content streams associated with a plurality of client electronic devices 202 within a plurality of client display regions 1002, exemplarily illustrated as 1002a-1002d in FIG. 10. Additionally, the playback module may be configured to playback a selected content stream within a master display region 1004. In an instance, the master display region 1004 may be substantially larger than each of the plurality of client display regions 1002. In another instance, the master display region 1004 may be similar in size compared to each of the plurality of client display regions 1002. For example, a display screen of the master electronic device 200 may be divided into a plurality of display tiles of equal size. Further, the display screen may be configured to display the plurality of content streams in the plurality of display tiles.

Additionally, in some embodiments, the display screen may be configured to display a content captured by the master electronic device 200 in a display tile of the plurality of display tiles. In yet another instance, the master display region 1004 may occupy the entire display screen of the master electronic device 200. Further, the touch-enabled input module 204 may be configured to receive a client-selection input from a user operating the master electronic device 200. The client-selection input may identify a client electronic device of the one or more client electronic devices 202. Accordingly, the playback module may be configured to play a content stream captured by the client electronic device identified by the client-selection input.

Figure 7:
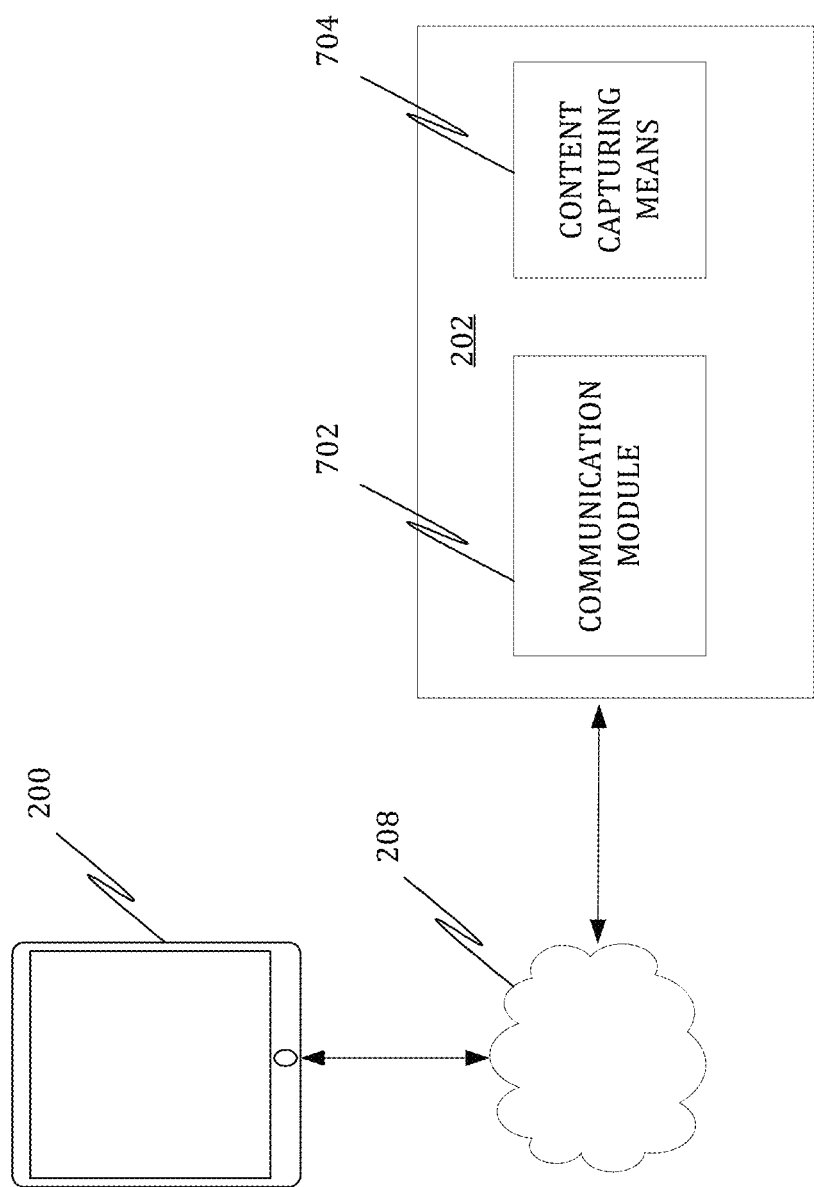
FIG. 7 illustrates a client electronic device configured to capture content based on one or more session parameters according to various embodiments.

According to some embodiments, a client electronic device 202 configured to control capture of content is illustrated in FIG. 7. The client electronic device 202 may be an instance of the one or more client electronic devices 202 described earlier in conjunction with FIG. 2 to FIG. 6. The client electronic device 202 may include a communication module 702 configured to communicate data between the client electronic device 202 and the master electronic device 200. In various embodiments, the communication module 702 included in the client electronic device 202 may be configured for wireless transmission over one or more communication channels 208. The one or more communication channels 208 may include one or more of a local-area-network connection, a Wi-Fi connection, and a Bluetooth connection. In an instance, the communication module 702 included in the client electronic device 202 may be configured for wireless reception of the one or more session parameters transmitted by the master electronic device 200. Additionally, the client electronic device 202 may include a content capturing means 704 to capture content based on the one or more session parameters. The content capturing means 704 may be activated based on the one or more session parameters received from the master electronic device 200. In various embodiments, the content capturing means 704 may include one or more of an image capturing means such as a video camera and a sound capturing means such as a microphone. Accordingly, in various embodiments, the content captured by the client electronic device 202 may include one or more of an image and a sound.

In various embodiments, the communication module 702 included in the client electronic device 202 may be configured for receiving the time value transmitted by the master electronic device 200. The time value may correspond to one or more of initiation of capture of the content, pausation of capture of the content and termination of capture of the content. In addition, in various embodiments, the client electronic device 202 may include a client timing module 802 configured to be synchronized with the master timing module 402 included in the master electronic device 200 as illustrated in FIG. 8. Details regarding the client timing module 802 may be understood from description of master timing module 402 provided above. Further, the synchronization of the client timing module 802 with the master timing module 402 may be based on the time value received from the master electronic device 200. Accordingly, each of the master electronic device 200 and the client electronic device 202 may be configured to have a common time base. As a result, in an instance, each of the content captured by the master electronic device 200 and the content captured by the client device may correspond to the same time instants. For example, in various embodiments, each of the client electronic device 202 and the master electronic device 200 may be configured to capture content synchronously according to the one or more session parameters.

In various embodiments, the communication module 702 included in the client electronic device 202 may be configured for reception of an indication of one or more operations in addition to the time value. Further, the client electronic device 202 may include a processor configured to perform the one or more operations at a time indicated in the time value.

In another embodiment, the communication module 702 may be further configured for wireless reception of the invitation from the master electronic device 200. The invitation may be a request to participate in the content capture session. Accordingly, in various embodiments, the user interface module 802 included in the client electronic device 202 may be further configured for reception of the accept-invite input. Further, the content capture means included in the client electronic device 202 may be configured to capture content based on reception of the accept-invite input and in accordance with the one or more session parameters.

In various embodiments, two or more client electronic devices, which are instances of the client electronic device, may receive the invitation to participate in a collaborative content capture session. In another embodiment, the client electronic device 202 may receive the invitation to participate in a collaborative content capture session with the master electronic device 200. In other words, each of the master electronic device 200 and the client electronic device 202 may be configured to collaboratively capture content. For instance, each of the master electronic device 200 and the client electronic device 202 may capture content corresponding to a scene including one or more physical objects. As another instance, the master electronic device 200 may be configured to capture content corresponding to a first scene while the client electronic device 202 may be configured to capture content corresponding to the second scene.

Further, in various embodiments, the communication module 702 included in the client electronic device 202 may be configured for wireless transmission of content captured by the client electronic device 202 to the master electronic device 200.

In another embodiment, the communication module 702 included in the client electronic device 202 may be configured for wireless transmission of content captured by an electronic device to another client electronic device. Accordingly, in various embodiments, the communication module 702 included in the client electronic device 202 may be further configured for wireless reception of content captured by one or more of the master electronic device 200 and another client electronic device.

Further, the communication module 206 included in the master electronic device 200 may be configured for wireless transmission of content captured by the master electronic device 200 to the client electronic device. As a result, in various embodiments, content captured by one or more of the master electronic device 200 and one or more client electronic devices 202 may be shared with the master electronic device 200 and/or one or more client electronic devices 202.

In accordance with various embodiments, a user of the master electronic device 200 called a "director" may be enabled to control content capturing using the one or more client electronic devices 202 operated by users called "camera persons". Initially, the director may be presented with a GUI to select one or more camera persons. Accordingly, the one or more client electronic devices 202 associated with the one or more camera persons may be identified and selected.

Subsequently, the director may be enabled to invite the one or more camera persons to participate in a collaborative content capturing session. Consequently, the invitation may be transmitted to the one or more client electronic devices 202 from the master electronic device 200.

Subsequently, the invitation may be displayed on a display screen of the one or more client electronic devices 202. Further, the one or more camera persons may be presented with an option to either accept or reject the invitation. Accordingly, acceptance or rejection of the invitation may be transmitted back to the master electronic device 200.

Thereafter, the master electronic device 200 may display acceptance or rejection of the invitation corresponding to each of the one or more client electronic devices 202. Further, in some embodiments, each of the master electronic device 200 and the one or more client electronic devices may be configured to display names of each of the director and the one or more camera persons who accepted the invitation.

Additionally, in some embodiments, details about the one or more client electronic devices 202 such as, but not limited to, device type, Operating System type and content capturing capabilities such as max. camera resolution, max. zoom level, max. frame rate etc. may be presented to the director.

Subsequently, the director may provide the indication of the one or more session parameters through the GUI of the master electronic device 200 to control capture of content in collaboration with the one or more client electronic devices 202. For instance, the indication may correspond to an operation such as, for example, initiation of content capture, pausation of content capture and termination of content capture. Additionally, the one or more session parameters may include, for example, camera settings to be used while capturing content. Thereafter, the one or more session parameters may be transmitted to the one or more client electronic devices 202. Upon receiving the one or more session parameters, the one or more client electronic devices 202 may perform one or more operations in relation to one or more of capturing content, storing captured content, processing captured content and transmitting captured content. For instance, upon receiving the indication of initiation of content capture, the one or more client electronic devices 202 may start capturing content synchronously. Similarly, upon receiving the indication of termination of content capture, the one or more client electronic devices 202 may stop capturing content.

Subsequently, the content captured by each of the one or more client electronic devices 202 may be transmitted to the master electronic device 200. Further, the content may be synchronously displayed on a display screen of the master electronic device 202. Thus, the director may be able to view content captured by the one or more client electronic devices 202.

The following discloses the various operations platform components may be performed. Although the method of FIG. 12 has been described to be performed by various components of platform 100, it should be understood that any electronic device (e.g., master electronic device 200, client electronic device 202, a computing device 1300 may be configured to perform the various stages of the method of FIG. 12 in any reasonable combination or, where feasible, individually. Furthermore, in some embodiments, different operations may be performed by different networked elements in operative communication.

Figure 12:
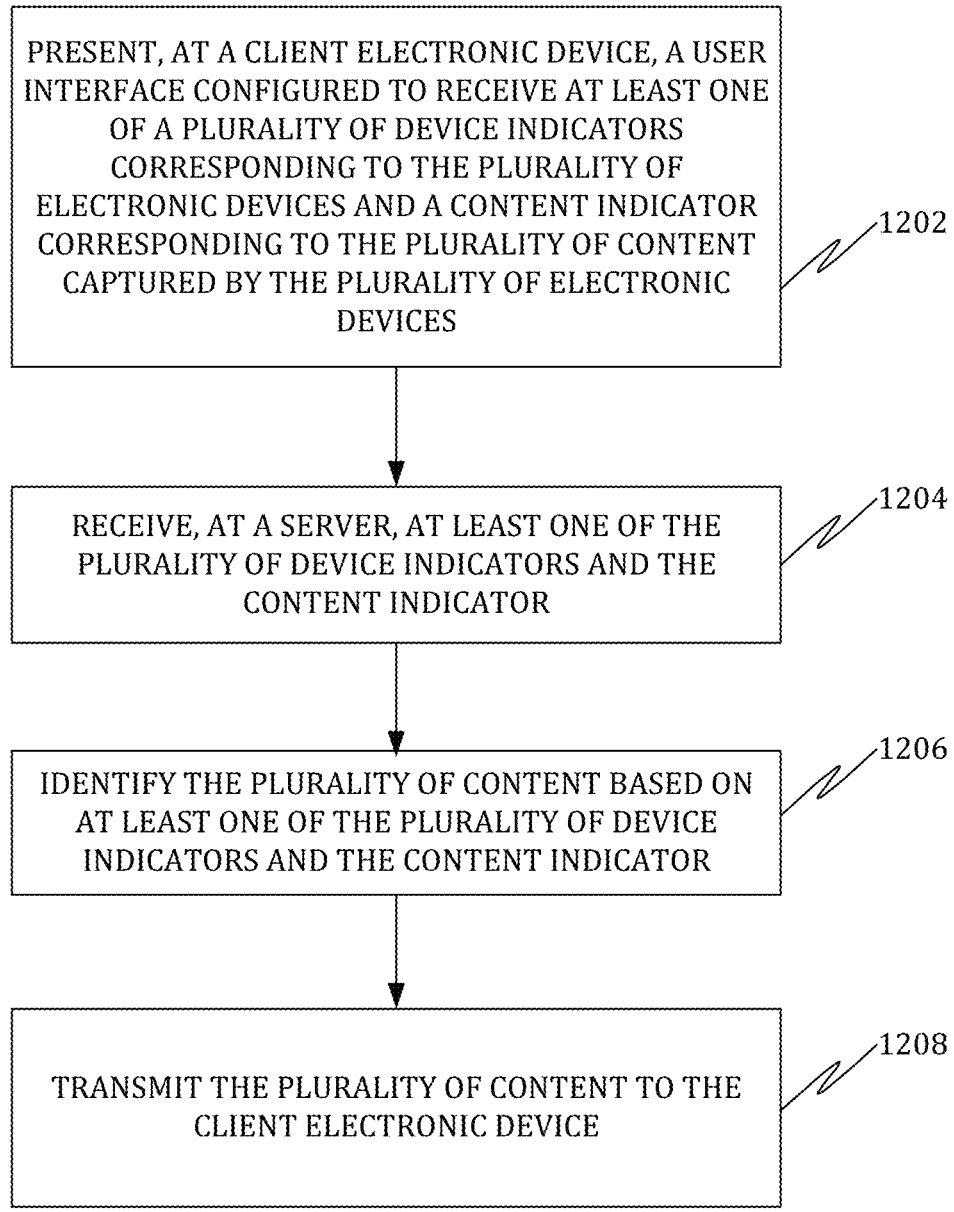
FIG. 12 illustrates a flowchart of a method of presenting a plurality of content captured by a plurality of electronic devices according to various embodiments.

Turning now to FIG. 12, a flow chart of a method of presenting a plurality of content captured by a plurality of electronic devices is illustrated. The plurality of electronic devices may include the master electronic device 200 and the one or more client electronic devices 202. The method may include presenting, at a client electronic device, a user interface configured to receive one or more of a plurality of device indicators corresponding to the plurality of electronic devices and a content indicator corresponding to the plurality of content captured by the plurality of electronic devices at step 1202. The client electronic device may be any electronic device configured for presenting the plurality of content. Examples of the client electronic device may include, but are not limited to, smart phone, laptop computer and tablet computer.

Further, the plurality of device indicators may be instances of the one or more device indicators described in detail in conjunction with FIG. 2. Furthermore, in some embodiments, the content indicator may be an alternative way of indicating the content captured by the plurality of electronic devices represented by the one or more device indicators. For instance, the content indicator may include an identifier corresponding to a content capture session participated by the plurality of electronic devices. As another instance, the content indicator may include a collage of images corresponding to content captured by the plurality of electronic devices. Accordingly, the user interface may be configured to display the collage of images, for example, in the form of a multiview-thumbnail image. Subsequently, a user of the client electronic device may select the collage of images through the user interface.

Further, the method may include receiving, at a server, one or more of the plurality of device indicators and the content indicator at step 1204. In some embodiments, the client electronic device and the server may be communicatively coupled over a network such as network 110 as explained in detail in conjunction with FIG. 1.

Additionally, the method may include identifying the plurality of content based on one or more of the plurality of device indicators and the content indicator at step 1206. Furthermore, at the method may include transmitting the plurality of content to the client electronic device at step 1208. In some embodiments, the method may include identifying a privacy setting corresponding to the plurality of content. Accordingly, the transmission of the plurality of content to the client electronic device may be based on the privacy setting. As a result, the plurality of content may be transmitted only to authorized client electronic devices.

Further, the client electronic device may be configured for presenting the plurality of content. Accordingly, the client electronic device may include a presentation device for presenting the plurality of content. For instance, the client electronic device may include a display device for presenting the plurality of content captured by a plurality of cameras. Further, the client electronic device may be configured to present each of the plurality of content synchronously. Therefore, in some embodiments, a user of the client electronic device may be able to view content captured from multiple angles during a common time duration corresponding to a content capture session participated by the plurality of electronic devices. Accordingly, each content of the plurality of content may previously be captured synchronously. However, in some other embodiments, two or more contents of the plurality of content may previously be captured asynchronously.

In some embodiments, the plurality of content may include a plurality of visual content. Additionally, the plurality of visual content may include each of a primary visual content and one or more secondary visual content. Further, the client electronic device may be configured for displaying the primary visual content in a primary display region of a display device and the one or more secondary visual contents in one or more secondary display regions of the display device. Further, the client electronic device may include the display device. As an example, the primary display region may be similar to display region 1004 as shown in FIG. 10, while the one or more secondary display regions may be similar to display regions 1002a-1002d.

Accordingly, in some embodiments, an area of the primary display region may be substantially larger than an area of each of the one or more secondary display regions as illustrated in FIG. 10. Further, in some embodiments, the method may include receiving a primary content indicator. Accordingly, the client electronic device may be configured to present the content of the plurality of content corresponding to the primary content indicator in the primary display region of a presentation device and one or more secondary content of the plurality of content in the one or more secondary display regions of the presentation device.

Additionally, in some embodiments, the method may include periodically updating the primary content indicator. Accordingly, the client electronic device may be configured to periodically present each of the plurality of content in the primary display region of the presentation device. As a result, a user of the client electronic device may be able to view each of the plurality of content with a better viewing experience.

While various embodiments of the disclosed methods and systems have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

IV. Computing Device Architecture

Platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although the methods of FIG. 12 has been described to be performed by a computing device 1300, it should be understood that, in some embodiments, different operations may be performed by different networked elements in operative communication with computing device 1300.

Embodiments of the present disclosure may comprise a system having a memory storage and a processing unit. The processing unit coupled to the memory storage, wherein the processing unit is configured to perform the stages of the method of FIG. 12.

Figure 13:
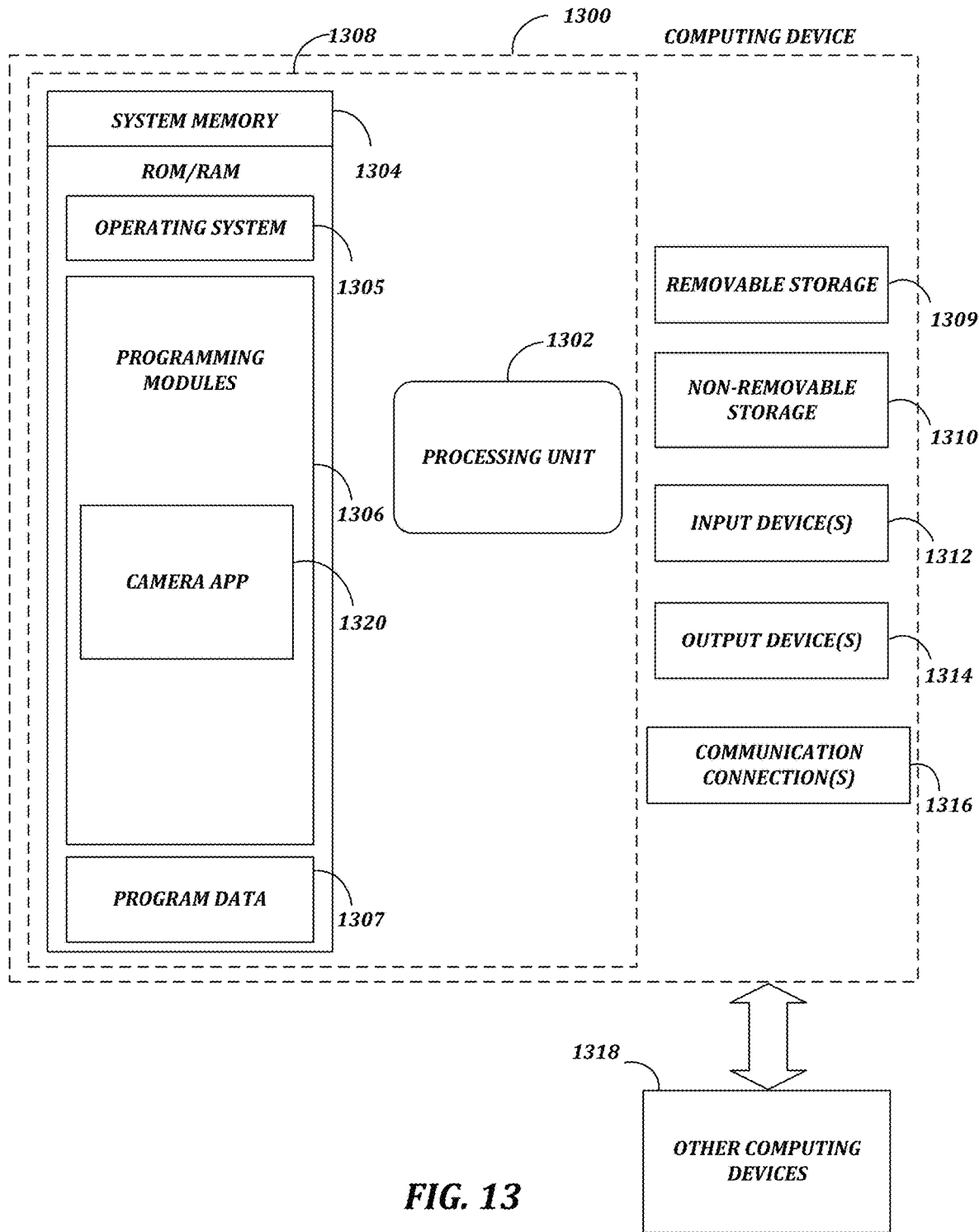
FIG. 13 is a block diagram of a system including a computing device for performing the method of FIG. 12.

FIG. 13 is a block diagram of a system including computing device 1300. Consistent with various embodiments of the disclosure, the aforementioned memory storage and processing unit may be implemented in a computing device, such as computing device 1300 of FIG. 1. Any suitable combination of hardware, software, or firmware may be used to implement the memory storage and processing unit. For example, the memory storage and processing unit may be implemented with computing device 1300 or any of other computing devices 1318, in combination with computing device 1300. The aforementioned system, device, and processors are examples and other systems, devices, and processors may comprise the aforementioned memory storage and processing unit, consistent with embodiments of the disclosure.

With reference to FIG. 13, a system consistent with various embodiments of the disclosure may include a computing device, such as computing device 1300. In a basic configuration, computing device 1300 may include at least one processing unit 1302 and a system memory 1304. Depending on the configuration and type of computing device, system memory 1304 may comprise, but is not limited to, volatile (e.g., random access memory (RAM)), non-volatile (e.g., read-only memory (ROM)), flash memory, or any combination. System memory 1304 may include operating system 1305, one or more programming modules 1306, and may include a program data 1307. Operating system 1305, for example, may be suitable for controlling computing device 1300's operation. In one embodiment, programming modules 1306 may include a camera app 1320.

Furthermore, embodiments of the disclosure may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and nonvolatile, removable and non-removable media implemented in any method or technology for storage of information, such as computer readable instructions, data structures, program modules, or other data. System memory 1304, removable storage 1309, and non-removable storage 1310 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 100. Computing device 1300 may also have input device(s) 1312 such as a keyboard, a mouse, a pen, a sound input device, a touch input device, etc. Output device(s) 1314 such as a display, speakers, a printer, etc. may also be included. The aforementioned devices are examples and others may be used.

Computing device 1300 may also contain a communication connection 1316 that may allow device 100 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g., the camera app 1320) may perform processes including, for example, one or more stages of the method of FIG. 12 as described above. The aforementioned process is an example, and processing unit 1302 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A master electronic device configured to create a content capture session executable by a plurality of electronic devices comprising at least one client electronic device, the master electronic device comprising:
   a user interface module configured to receive at least one session parameter;
   a processor configured to create at least one content capture session based on the at least one session parameter; and
   a communication means configured to communicate data between the master electronic device and at least one client electronic device, wherein the communication comprises transmission of at least one session parameter, the at least one client electronic device being configured to participate in the at least one content capture session according to the at least one session parameter,
   wherein the at least one session parameter comprises at least one camera setting, wherein the at least one client electronic device is configured to capture at least one image based on the at least one camera setting.

2. The master electronic device of claim 1, wherein the at least one session parameter further comprises at least one device indicator, wherein the at least one client electronic device is configured to participate in the at least one content capture session based on the at least one device indicator.

3. The master electronic device of claim 1, wherein the at least one session parameter further comprises at least one time value, wherein the at least one client electronic device is configured to perform at least one operation corresponding to the at least one content capture session based on the at least one time value.

4. The master electronic device of claim 3, wherein the at least one operation corresponding to the at least one content capture session comprises at least one of initiation of content capture, pausation of content capture, termination of content capture and processing of content captured by the at least one client electronic device.

5. The master electronic device of claim 1, wherein the at least one session parameter further comprises at least one operation indicator, wherein the at least one client electronic device is configured to perform at least one operation based on the at least one operation indicator.

6. The master electronic device of claim 1, wherein the at least one session parameter further comprises a storage setting, wherein the at least one client electronic device is configured to store content captured by the at least one client electronic device based on the storage setting.

7. The master electronic device of claim 1, wherein the at least one session parameter further comprises a transmission setting, wherein the at least one client electronic device is configured to transmit content captured by the at least one client electronic device based on the transmission setting.

8. The master electronic device of claim 1, wherein the at least one session parameter further comprises a privacy setting, wherein the at least one client electronic device is configured to restrict access to content captured by the at least one client electronic device based on the privacy setting.

9. The master electronic device of claim 1, wherein the at least one session parameter further comprises a rule, wherein the at least one client electronic device is configured to perform at least one operation based on the rule.

10. The master electronic device of claim 9, wherein the at least one session parameter further comprises a context, wherein the at least one client electronic device is configured to perform the at least one operation based further on the context.

11. The master electronic device of claim 1, wherein communicating the data further comprises receiving at least one content captured by the at least one client electronic device.

12. The master electronic device of claim 1, further comprising a means to capture content, wherein the means to capture content is configured to capture content based on the at least one session parameter.

13. The master electronic device of claim 12, further comprising a presentation means configured to present at least one of content captured by the at least one client electronic device and content captured by the master electronic device.

14. The master electronic device of claim 1, wherein the at least one session parameter comprises a master-mode indicator, wherein a client device of the at least one client electronic device is configured to operate as a master electronic device based on the master-mode indicator.

15. A master electronic device configured to create a content capture session executable by a plurality of electronic devices comprising at least one client electronic device, the master electronic device comprising:
  a user interface module configured to receive at least one session parameter;
  a processor configured to create at least one content capture session based on the at least one session parameter; and
  a communication means configured to communicate data between the master electronic device and at least one client electronic device, wherein the communication comprises transmission of at least one session parameter, the at least one client electronic device being configured to participate in the at least one content capture session according to the at least one session parameter,
  wherein the at least one session parameter comprises at least one camera setting, wherein the at least one client electronic device is configured to capture at least one image based on the at least one camera setting.

16. The master electronic device of claim 15, wherein the at least one session parameter further comprises a transmission setting, wherein the at least one client electronic device is configured to transmit content captured by the at least one client electronic device based on the transmission setting.

17. The master electronic device of claim 15, wherein the at least one session parameter further comprises a master-mode indicator, wherein a client device of the at least one client electronic device is configured to operate as a master electronic device based on the master-mode indicator.

18. The master electronic device of claim 15, further comprising a means to capture content, wherein the means to capture content is configured to capture content based on the at least one session parameter.

19. The master electronic device of claim 18, further comprising a presentation means configured to present at least one of content captured by the at least one client electronic device and content captured by the master electronic device.

20. The master electronic device of claim 19, wherein the presentation means is configured to present both the content captured by the at least one client electronic device and the content captured by the master electronic device.

* * * * *